US011886134B2

(12) United States Patent
Fujiwara

(10) Patent No.: US 11,886,134 B2
(45) Date of Patent: Jan. 30, 2024

(54) HEATING DEVICE, FIXING DEVICE, AND IMAGE FORMING APPARATUS

(71) Applicant: Hitoshi Fujiwara, Kanagawa (JP)

(72) Inventor: Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/825,421

(22) Filed: May 26, 2022

(65) Prior Publication Data

US 2022/0397847 A1 Dec. 15, 2022

(30) Foreign Application Priority Data

Jun. 10, 2021 (JP) ................................ 2021-097479

(51) Int. Cl.
*G03G 15/20* (2006.01)

(52) U.S. Cl.
CPC ..... *G03G 15/2017* (2013.01); *G03G 15/2053* (2013.01)

(58) Field of Classification Search
CPC ............ G03G 15/205; G03G 15/2017; G03G 15/2039; G03G 15/2053; G03G 2215/2003
See application file for complete search history.

(56) References Cited

U.S. PATENT DOCUMENTS

2014/0138372 A1* 5/2014 Ogura ................ G03G 15/2042 399/329
2020/0033768 A1 1/2020 Furuichi et al.
2020/0033776 A1 1/2020 Yoshinaga et al.
2020/0103803 A1 4/2020 Furuichi
2022/0317607 A1* 10/2022 Watatani ............ G03G 15/5004

FOREIGN PATENT DOCUMENTS

JP 2003-005572 1/2003
JP 2006-163297 6/2006
JP 2020-024370 2/2020
JP 2020-098312 6/2020

* cited by examiner

*Primary Examiner* — Thomas S Giampaolo, II
(74) *Attorney, Agent, or Firm* — Harness, Dickey & Pierce, P.L.C.

(57) ABSTRACT

A heating device includes a heater, a safety device, and a holder. The safety device has a heat-sensitive surface facing the heater. The safety device cuts off power supply to the heater in response to reaching a temperature of the heat-sensitive surface to be equal to or higher than a predetermined temperature. The holder holds the heater. The holder has a through hole that opens toward the heater and includes a step portion disposed on an inner circumferential surface of the through hole. The step portion supports an end of the heat-sensitive surface such that a central portion of the heat-sensitive surface of the safety device is not in contact with the heater.

20 Claims, 16 Drawing Sheets

FIG. 9C
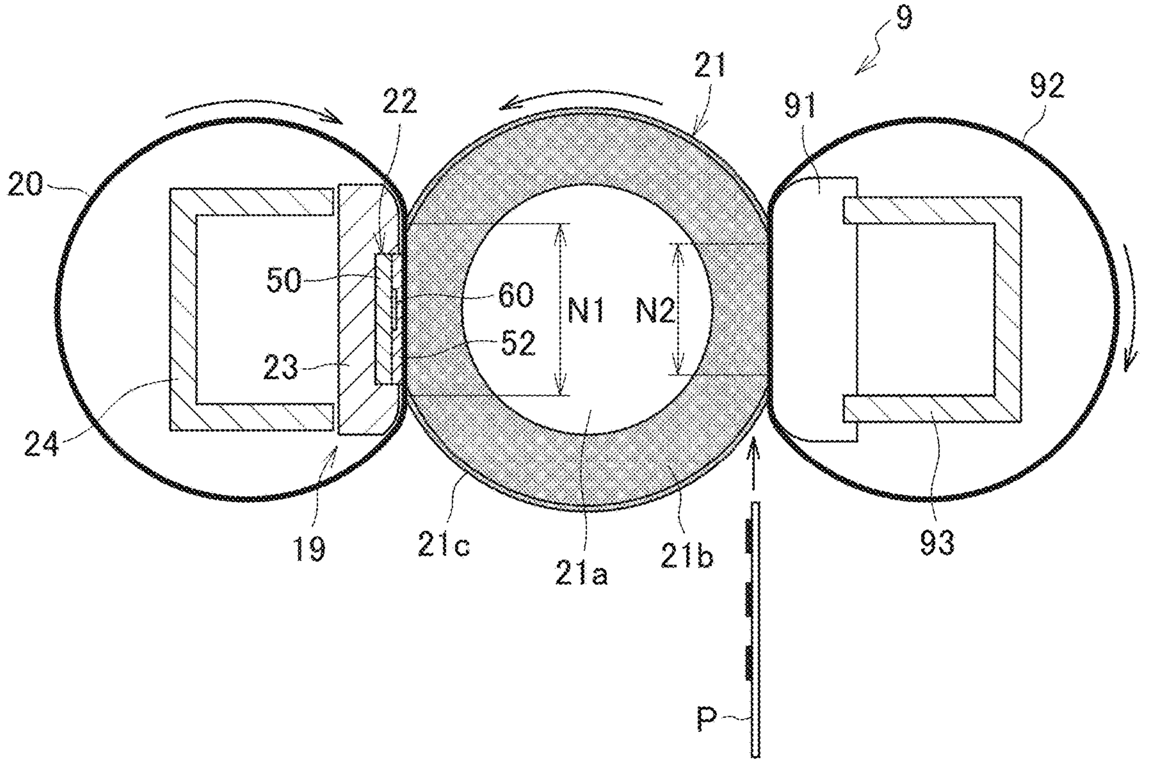
FIG. 10A
FIG. 10B
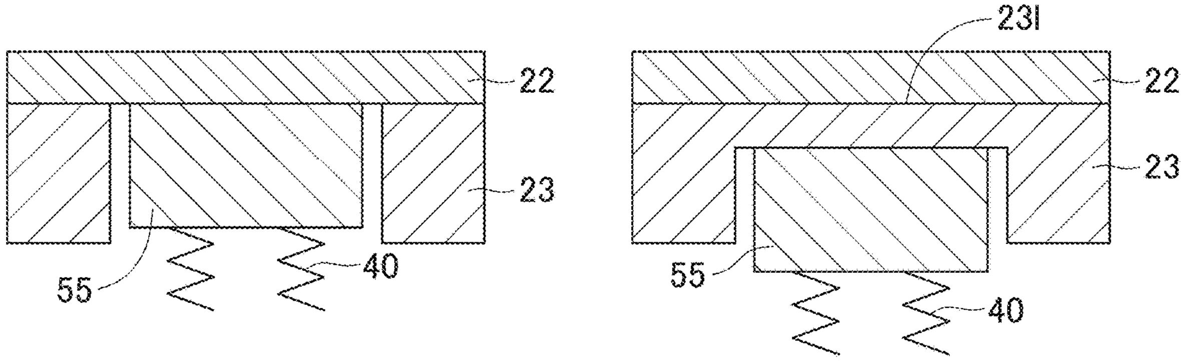

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-097479, filed on Jun. 10, 2021, in the Japan Patent Office, the entire disclosure of which is hereby incorporated by reference herein.

BACKGROUND

Technical Field

Embodiments of the present disclosure relate to a heating device, a fixing device, and an image forming apparatus. Specifically, the embodiments of the present disclosure relate to a heating device including a safety device to prevent a heater from overheating, a fixing device including the heating device, and an image forming apparatus including the heating device.

Related Art

An image forming apparatus such as a copier or a printer includes a heating device including a heater, such as a fixing device fixing toner onto a sheet by heat or a drying device drying ink on the sheet. The heating device includes a safety device such as a thermostat to protect a power supply circuit and prevent the heater from overheating.

SUMMARY

This specification describes an improved heating device that includes a heater, a safety device, and a holder. The safety device has a heat-sensitive surface facing the heater. The safety device cuts off power supply to the heater in response to reaching a temperature of the heat-sensitive surface to be equal to or higher than a predetermined temperature. The holder holds the heater. The holder has a through hole that opens toward the heater and includes a step portion disposed on an inner circumferential surface of the through hole. The step portion supports an end of the heat-sensitive surface such that a central portion of the heat-sensitive surface of the safety device is not in contact with the heater.

This specification also describes a fixing device that includes the heating device.

This specification further describes an image forming apparatus including the fixing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9C is a schematic cross-sectional view of a fixing device having a structure different from the fixing devices of FIGS. 2A, 9A, and 9B;

FIG. 10A is a cross-sectional view of an attachment structure of the safety device attached to the holder according to a first comparative embodiment;

FIG. 10B is a cross-sectional view of an attachment structure of the safety device attached to the holder according to a second comparative embodiment;

DETAILED DESCRIPTION

Figure 1:
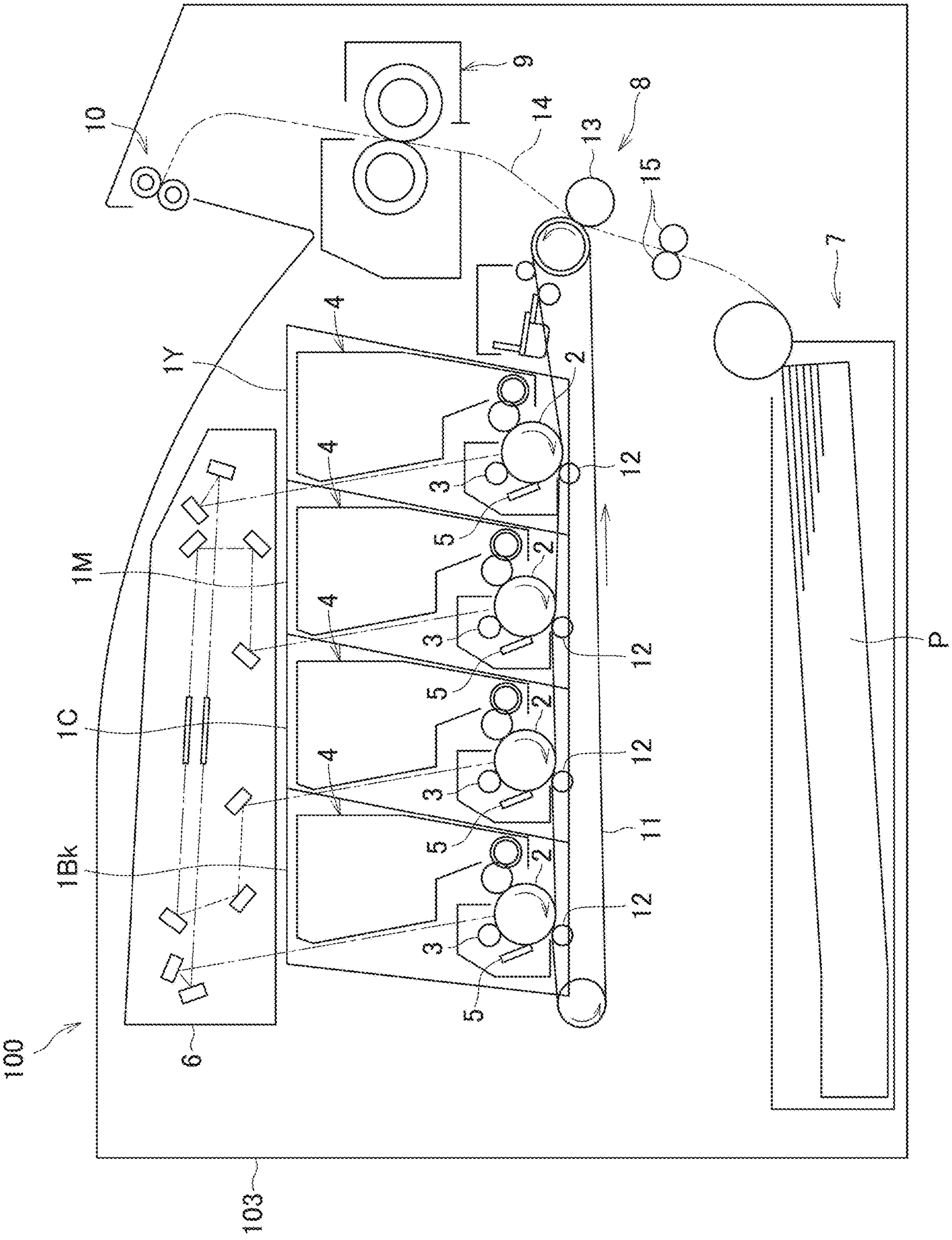
FIG. 1 is a schematic diagram illustrating a configuration of an image forming apparatus according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. Identical reference numerals are assigned to identical components or equivalents and a description of those components is simplified or omitted.

The structure of an image forming apparatus is described below.

FIG. 1 is a schematic diagram illustrating a configuration of an image forming apparatus 100 according to the embodiment of the present disclosure. The image forming apparatus 100 is a printer. Alternatively, the image forming apparatus may be a copier, a facsimile machine, a multifunction peripheral (MFP) having at least two of printing, copying, facsimile, scanning, and plotter functions, or the like.

As illustrated in FIG. 1, the image forming apparatus 100 includes four image forming units 1Y, 1M, 1C, and 1Bk serving as image forming devices, respectively. The image forming units 1Y, 1M, 1C, and 1Bk are removably installed in a body 103 of the image forming apparatus 100. The image forming units 1Y, 1M, 1C, and 1Bk have a similar configuration except that the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as a developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9, and a sheet ejection device 10. The exposure device 6 exposes the surface of each of the photoconductors 2 and forms an electrostatic latent image on the surface of each of the photoconductors 2. The sheet feeder 7 supplies a sheet P serving as a recording medium to the transfer device 8. The transfer device 8 transfers the toner image formed on each of the photoconductors 2 onto the sheet P. The fixing device 9 fixes the toner image transferred onto the sheet P thereon. The sheet ejection device 10 ejects the sheet P onto an outside of the image forming apparatus 100.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The four primary transfer rollers 12 are in contact with the respective photoconductors 2 via the intermediate transfer belt 11.

Thus, the intermediate transfer belt 11 contacts each of the photoconductors 2, forming a primary transfer nip therebetween. The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

The image forming apparatus 100 includes a sheet conveyance path 14 through which the sheet P fed from the sheet feeder 7 is conveyed. A timing roller pair 15 is disposed in the sheet conveyance path 14 at a position between the sheet feeder 7 and the secondary transfer nip defined by the secondary transfer roller 13.

Next, a description is given of printing processes performed by the image forming apparatus 100 with reference to FIG. 1.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential.

Subsequently, the exposure device 6 exposes the surface of each of the photoconductors 2 based on image data created by a scanner that reads an image on an original or print data instructed by a terminal, thus decreasing the electric potential of an exposed portion on the photoconductor 2 and forming an electrostatic latent image on the photoconductor 2. The developing device 4 supplies toner to the electrostatic latent image formed on the photoconductor 2, forming a toner image thereon.

The toner images formed on the photoconductors 2 reach the primary transfer nips defined by the primary transfer rollers 12 with the rotation of the photoconductors 2 and are transferred onto the intermediate transfer belt 11 driven and rotated counterclockwise in FIG. 1 successively such that the toner images are superimposed on the intermediate transfer belt 11, forming a full color toner image thereon. Thereafter, the full color toner image formed on the intermediate transfer belt 11 is conveyed to the secondary transfer nip defined by the secondary transfer roller 13 in accordance with rotation of the intermediate transfer belt 11 and is transferred onto the sheet P conveyed to the secondary transfer nip.

The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip.

Thus, the full color toner image is transferred onto and borne on the sheet P. After the toner image is transferred onto the intermediate transfer belt 11, the cleaner 5 removes residual toner remained on the photoconductor 2 therefrom. The image forming apparatus 100 may have a direct transfer system that does not use the intermediate transfer belt 11. In the direct transfer system, the sheet P sequentially passes through the primary transfer nips, and the toner images are directly transferred onto the sheet P.

After the full color toner image is transferred onto the sheet P, the sheet P is conveyed to the fixing device 9 to fix the toner image on the sheet P. Subsequently, the sheet ejection device 10 ejects the sheet P outside the image forming apparatus 100, and the series of printing processes are completed.

Next, a configuration of the fixing device 9 is described.

Figure 2A:
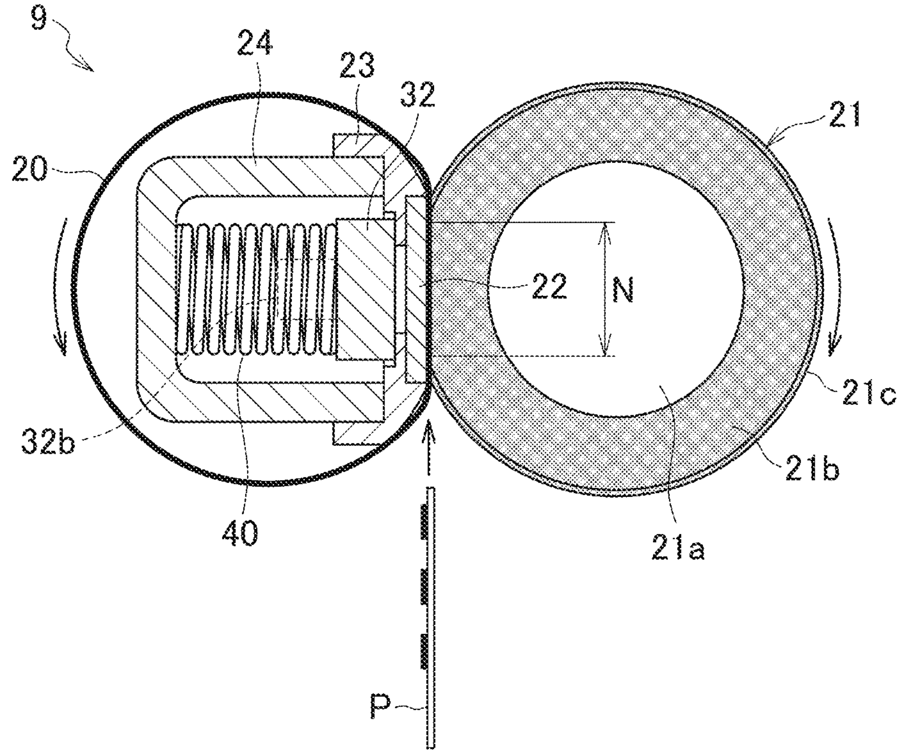
FIG. 2A is a schematic diagram illustrating a configuration of a fixing device incorporated in the image forming apparatus of FIG. 1.

As illustrated in FIG. 2A, the fixing device 9 according to this embodiment includes a fixing belt 20, a pressure roller 21, and a heater 22. The fixing belt 20 is an endless belt serving as a fixing rotator or a fixing member. The pressure roller 21 serves as an opposed rotator or an opposed member that contacts an outer circumferential surface of the fixing belt 20. The heater 22 is a planar heater and heats the fixing belt 20.

The heater 22 is held by a holder 23 supported by a stay 24. The holder 23 and the stay 24 are disposed inside the loop of the fixing belt 20. The stay 24 as a reinforcement supports and reinforces over a region of the holder 23 in the longitudinal direction of the holder 23.

Figure 2B:
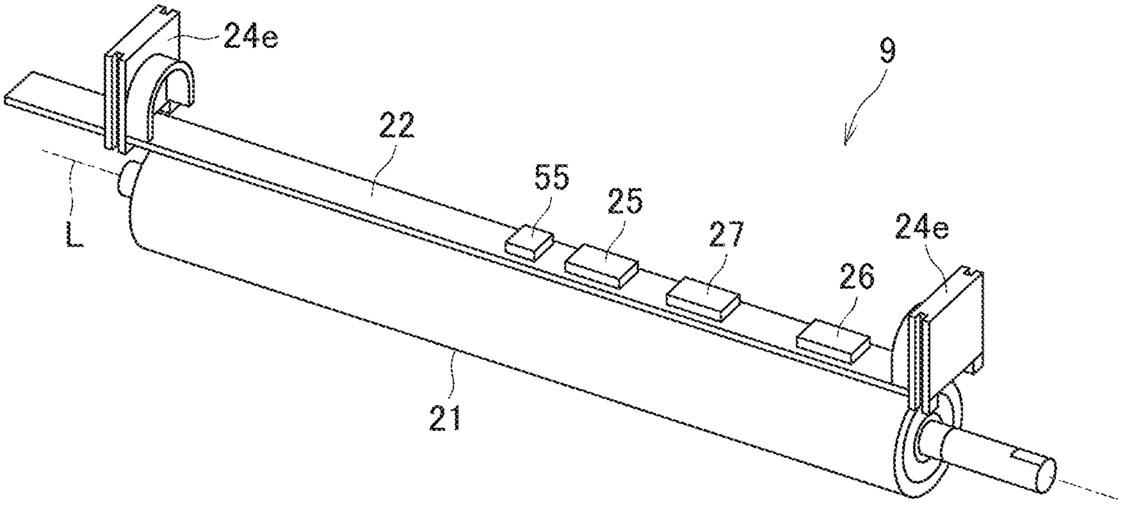
FIG. 2B is a perspective view of the fixing device of FIG. 2A in which a fixing belt and a stay are eliminated.
Figure 2C:
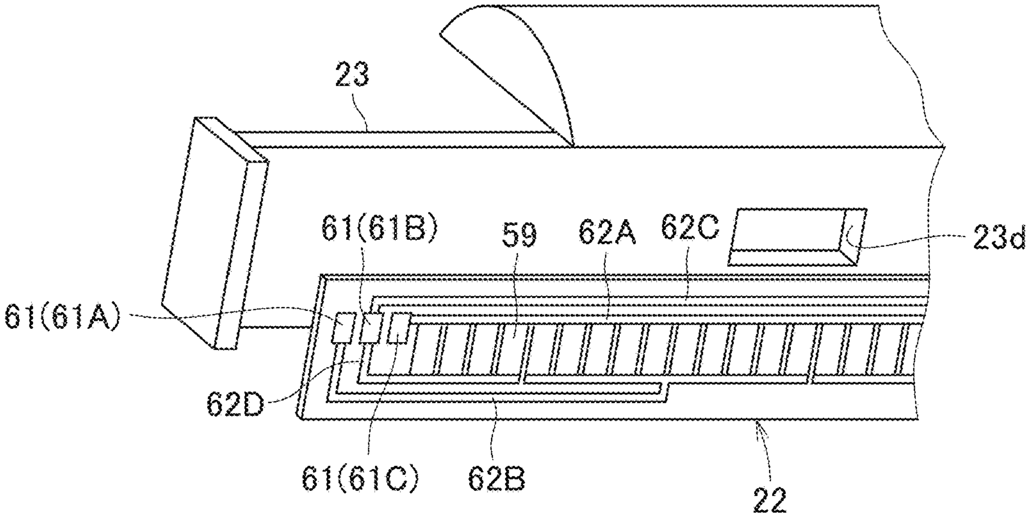
FIG. 2C is a partial perspective view of a structure to set a heater on a holder in the fixing device of FIG. 2A.
Figure 2D:
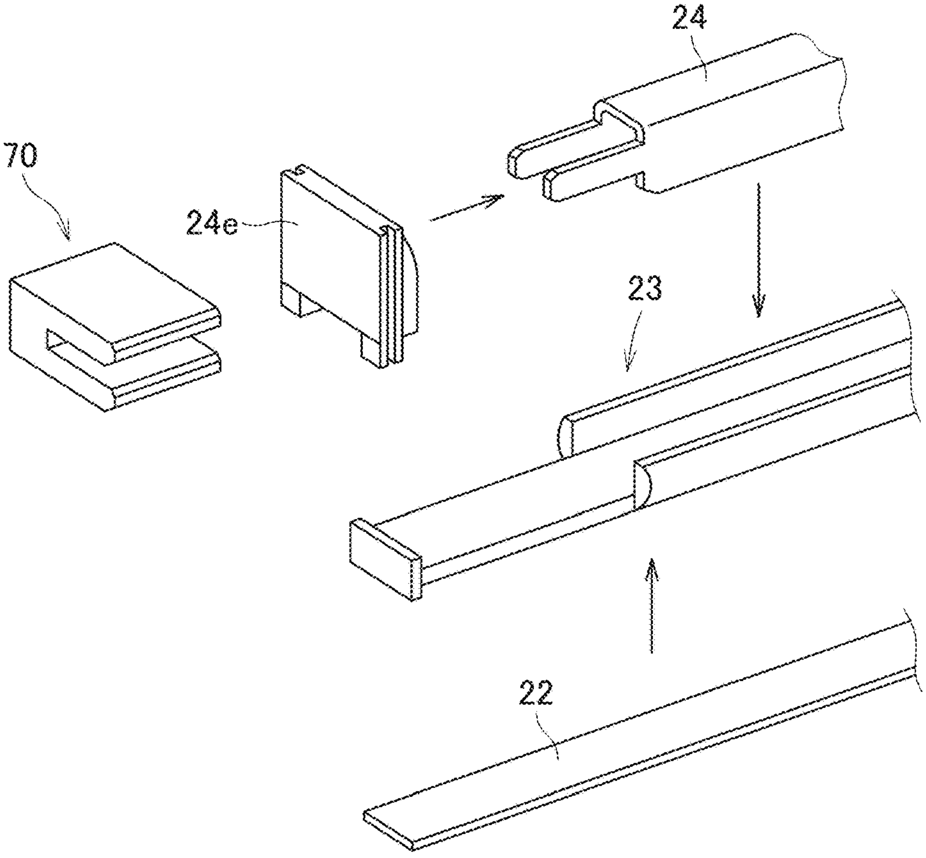
FIG. 2D is an exploded perspective view of a part including the heater, the holder, the stay, and the like in the fixing device of FIG. 2A.

As illustrated in FIG. 2B, a plurality of temperature sensors 25, 26, and 27 and a safety device 55 are disposed at a plurality of positions in the longitudinal direction of the heater 22 on a back side of the heater 22. As illustrated in FIGS. 2C and 2D, the holder 23 holds the back side of the heater 22.

A plurality of heat generating blocks 59 are disposed on the front side of the heater 22 as illustrated in FIG. 2C. Details of the temperature sensors 25, 26, and 27, and the safety device 55 will be described later with reference to FIGS. 3A, 4A to FIGS. 8, and 12A and 12B.

The stay 24 is configured by a channeled metallic member. Both ends of the stay 24 are attached to caps 24*e* illustrated in FIGS. 2B and 2D. The caps 24*e* are supported by both side plates of the fixing device 9. The stay 24 supports a stay side face of the holder 23. The stay side face faces the stay 24 and is opposite a heater side face of the holder 23. The heater side face faces the heater 22. Accordingly, the stay 24 retains the heater 22 and the holder 23 to be immune from being bent substantially by pressure from the pressure roller 21, which maintains the heater 22 and the holder 23 to be straight. As a result, the nip N is formed between the fixing belt 20 and the pressure roller 21, and the pressure roller 21 presses the fixing belt 20 by a constant pressure in a width direction of the fixing belt 20 that is the axial direction of the pressure roller 21.

Since heat from the heater 22 heats the holder 23 to a high temperature, the holder 23 is preferably made of a heat resistant material. For example, if the holder 23 is made of heat resistant resin having a decreased thermal conductivity, such as liquid crystal polymer (LCP) or PEEK, the holder 23 reduces heat transfer from the heater 22 to the holder 23, and the heater 22 can efficiently heat the fixing belt 20.

The heat-resistant resin may be selected from LCP resin, phenol resin, fluorine resin, polyimide resin, polyamide resin, polyamide-imide resin, polyether ether ketone (PEEK) resin, polyether sulfone (PES) resin, polyphenylene sulfide (PPS) resin, perfluoroalkoxy alkane (PFA) resin, polytetrafluoroethylene (PTFE) resin, and tetrafluoroethylene hexafluoropropylene copolymer (4.6 fluoride) (FEP) resin. The holder 23 may be an extruded product made by extruding one of the above heat resistant resins in the longitudinal direction of the holder.

The fixing belt 20 includes, for example, a tubular base made of polyimide (PI), and the tubular base has an outer diameter of 24 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 μm to 50 μm to enhance durability of the fixing belt 20 and facilitate separation of the sheet P and a foreign substance from the fixing belt 20.

Optionally, an elastic layer that is made of rubber or the like and has a thickness in a range of from 50 μm to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 has, for example, an outer diameter from 24 mm to 30 mm and includes a solid iron core 21*a*, an elastic layer 21*b* on the surface of the core 21*a*, and a release layer 21*c* formed on the outside of the elastic layer 21*b*. The elastic layer 21*b* is made of silicone rubber and has a thickness from 3 mm to 4 mm, for example.

Preferably, the release layer 21*c* is formed by a fluororesin layer having, for example, a thickness of approximately 40 μm on the surface of the elastic layer 21*b* to improve releasability. Instead of the pressure roller 21, a member such as an endless pressure belt may be used as the opposed member opposite the outer peripheral surface of the fixing belt 20.

The heater 22 extends in a longitudinal direction thereof throughout an entire width of the fixing belt 20 in the width direction of the fixing belt 20. The heater 22 is disposed so as to contact the inner circumferential surface of the fixing belt 20. The heater 22 may not contact the fixing belt 20 or may be disposed opposite the fixing belt 20 indirectly via a low-friction sheet or the like. However, the heater 22 that contacts the fixing belt 20 directly enhances conduction of heat from the heater 22 to the fixing belt 20.

The heater 22 may contact the outer circumferential surface of the fixing belt 20. However, if the outer circumferential surface of the fixing belt 20 is brought into contact with the heater 22 and damaged, the fixing belt 20 may degrade quality of fixing the toner image on the sheet P. For this reason, in the present embodiment, the heater 22 contacts the inner circumferential surface of the fixing belt 20 advantageously.

A spring serving as a pressurizing means causes the fixing belt 20 and the pressure roller 21 to press against each other. Thus, the nip N is formed between the fixing belt 20 and the pressure roller 21. As a driving force is transmitted to the pressure roller 21 from a driver disposed in the body 103 of the image forming apparatus 100, the pressure roller 21 serves as a drive roller that drives and rotates the fixing belt 20.

The fixing belt 20 is driven and rotated by the pressure roller 21 as the pressure roller 21 rotates. Since the fixing belt 20 rotates and slides on the heater 22, a lubricant such as oil or grease may be interposed between the heater 22 and the fixing belt 20 to facilitate sliding performance of the fixing belt 20.

When printing starts, the driver drives and rotates the pressure roller 21, and the fixing belt 20 starts rotation in accordance with rotation of the pressure roller 21. Additionally, as power is supplied to the heater 22, the heater 22 heats the fixing belt 20. In a state in which the temperature of the fixing belt 20 reaches a predetermined target temperature (i.e., a fixing temperature), as the sheet P bearing the unfixed toner image is conveyed through the fixing nip N formed between the fixing belt 20 and the pressure roller 21 as illustrated in FIG. 2A, the fixing belt 20 and the pressure roller 21 fix the unfixed toner image on the sheet P under heat and pressure.

Next, the heater 22 is described.

Figure 3A:
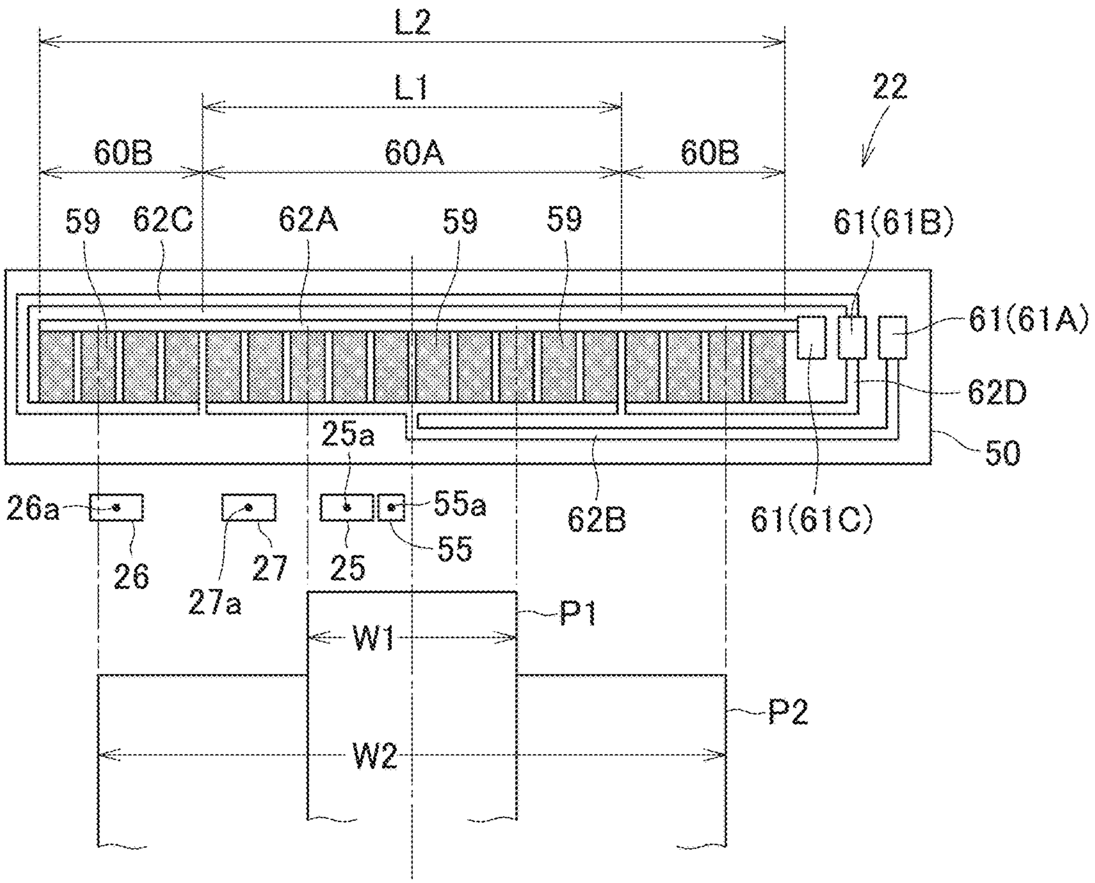
FIG. 3A is a plan view of the heater.
Figure 3B:
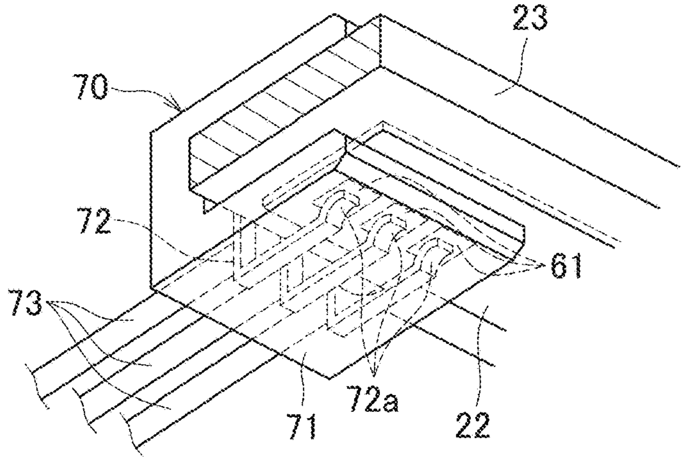
FIG. 3B is a perspective view of a connector attached to the heater and the holder.

FIG. 3A is a plan view of the heater 22, and FIG. 3B is a perspective view of a connector 70 attached to the heater 22 and the holder 23. The heater 22 includes a base 50, a heat insulating layer, and a coating layer. The heater 22 has a substantially rectangular plate shape having a longitudinal direction that is the same as the axial direction of the fixing belt 20. The width of the heater 22 in a sheet conveyance direction is, for example, 13 mm.

As illustrated in FIG. 3A, the heater 22 includes three heat generation portions 60B, 60A, and 60B arranged on the base 50 along the longitudinal direction of the base 50. One of the three heat generation portions is a central heat generation portion 60A as a first heat generation portion disposed at the center of the base 50 in the longitudinal direction of the base 50, and the remaining two heat generation portions are end heat generation portions 60B as second heat generation portions disposed adjacent to both ends of the central heat generation portion 60A in the longitudinal direction.

A plurality of electrodes 61 is disposed at one end of the base 50 to supply power to the respective heat generation portions. In FIG. 3A, the three electrodes 61 are referred to as a first electrode 61A, a second electrode 61B, and a third electrode 61C in order from the right side in FIG. 3A.

Each of the heat generation portions 60A and 60B includes a plurality of heat generating blocks 59 coupled in parallel. All the heat generating blocks 59 are coupled to the third electrode 61C through a common power supply line 62A.

A power supply line 62*b* couples the first electrode 61A to the heat generating blocks 59 in the central heat generation portion 60A. Power supply lines 62C and 62D couple the second electrode 61B to the heat generating blocks 59 in the end heat generation portions 60B at both ends of the base 50. Coupling the electrodes 61A to 61C in parallel to the central heat generation portion 60A and the end heat generation portions 60B as described above enables heat generation in each of the central heat generation portion 60A and the end heat generation portions 60B to be controlled independently.

A region of the heater 22 indicated by W1 in FIG. 3A extending in a width direction of a sheet is referred to as a sheet passing region of a sheet P1 passing through the nip N. The sheet P1 has a width W1 smaller than the width L1 of the central heat generation portion 60A. The sheet passing region of the sheet P1 is also referred to as a small sheet passing region W1 on the heater. A region of the heater 22 indicated by W2 in FIG. 3A extending in the width direction is a sheet passing region of a sheet P2 passing through the nip N. The sheet P2 has a width W2 larger than the width L1 of the central heat generation portion 60A. The sheet passing region of the sheet P2 is also referred to as a large sheet passing region W2 on the heater.

When a width of the sheet passing through the fixing device 9 is equal to or smaller than the width L1 of the central heat generation portion 60A in FIG. 3A, the central heat generation portion 60A generates heat, and the end heat generation portions 60B do not generate heat. When the width of the sheet passing through the fixing device 9 is larger than the width L1 of the central heat generation portion 60A, the end heat generation portions 60B generate heat in addition to the central heat generation portion 60A. The above-described configuration can change a width of a heat generation range in accordance with the width of the sheet passing region.

Additionally, the width L1 of the central heat generation portion 60A is set to a width of a small sheet (for example, a width corresponding to A4 sheet: 215 mm). The width L2 of the heat generation region from one end heat generation portion 60B to the other end heat generation portion 60B is set to a width of a large sheet (for example, a width corresponding to A3 sheet: 301 mm). In the above-described configuration, turning off the end heat generation portions 60B prevents an excessive temperature rise in a non-sheet passing region caused by many small sheets P1 passing through the fixing device. The above-described configuration can improve the productivity of printing because the above-described configuration does not need to reduce a print speed to prevent the excessive temperature rise.

As illustrated in FIG. 3B, the connector 70 is set to the heater 22 and the holder 23 in a short-side direction of the holder 23 and coupled to the three electrodes 61. The connector 70 includes a housing 71 made of resin and a contact terminal 72 anchored to the housing 71. The contact terminal 72 is a flat spring.

Each of the three contact terminals 72 has a contact 72*a* in contact with one of the electrodes 61 of the heater 22. The contact terminal 72 of the connector 70 is coupled to a harness 73 that is a conducting wire to supply power.

The connector 70 is attached to the heater 22 and the holder 23 such that the front sides of the heater 22 and the holder 23 and the back side of the holder 23 are sandwiched by the connector 70. Thus, the contacts 72*a* of the contact terminals 72 elastically contact and press against the electrodes 61 of the heater 22, respectively. The central heat generation portion 60A and the end heat generation portions 60B are electrically coupled to the power supply provided in the image forming apparatus via the connector 70 and are powered by the power supply.

Since the connector 70 serving as a power supply member also functions as a clamping member that clamps and holds the heater 22 and the holder 23 together, the fixing device 9 in the present embodiment does not need to have another clamping member. As a result, the number of components can be reduced.

The following describes how the safety device 55 and the temperature sensors 25 to 27 are arranged in the fixing device 9 with reference to FIG. 3A.

The temperature sensors are referred to as a first temperature sensor 25, a second temperature sensor 26, and a third temperature sensor 27 in the present embodiment. These safety device 55 may include, for example, a thermal fuse, a thermostat, a thermistor, or the like.

The thermal fuse is a one shot type protection element having a thermal cut-off function. When the temperature of the heater is equal to or higher than a threshold value, the thermal fuse cuts off the power supply of the heater and does not restore the power supply.

The thermostat cuts off the power supply to the heater when the temperature of the heater is equal to or higher than a threshold value and restores the power supply to the heater when the temperature of the heater is lower than the threshold value.

The thermistor is a semiconductor element that measures the heater temperature. A controller in the image forming apparatus 100 controls the power supply to the heater based on the temperature measured by the thermistor. In the present embodiment, the safety device 55 includes the thermostat, and the first to third temperature sensors 25 to 27 each include the thermistor.

As illustrated in FIG. 3A, a temperature detecting portion 25*a* of the first temperature sensor 25 is disposed so as to face the central heat generation portion 60A having the width L1 and face the small sheet passing region W1 on the heater 22. The temperature detecting portion 25*a* of the first temperature sensor 25 disposed as described above detects a temperature of a part of the heater 22 on the small sheet passing region W1 in the central heat generation portion 60A, in other words, the temperature of the part of the central heat generation portion 60A facing the small sheet P1 or sheets each having a larger width than the width W1 of the sheet P1 when the small sheet P1 or each of the sheets larger than the small sheet P1 passes through the fixing device.

Additionally, disposing the temperature detecting portion 25*a* of the first temperature sensor 25 within a region corresponding to a sheet passing region of the smallest sheet among a plurality of sizes of sheets each having a smaller width than the width L1 of the central heat generation portion 60A enables the first temperature sensor 25 to detect temperatures of regions corresponding to all sizes of sheets passing the vicinity of the central heat generation portion 60A.

As illustrated in FIG. 3A, a temperature detecting portion 26*a* of the second temperature sensor 26 is disposed so as to face the large sheet passing region W2 on the heater 22 outside the central heat generation portion 60A having the width L1. In other words, the temperature detecting portion 26*a* of the second temperature sensor 26 is disposed corresponding to a part of the large sheet passing region W2 facing the end heat generation portion 60B.

The temperature detecting portion 26*a* of the second temperature sensor 26 disposed as described above detects a temperature of a part of the heater 22 on the large sheet passing region W2 in the end heat generation portion 60B, in other words, the temperature of the part of the end heat generation portion 60B facing the large sheet P2 when the large sheet P2 passes through the fixing device.

In the case that a plurality of sizes of sheets passes over the end heat generation portion 60B, the temperature detecting portion 26*a* of the second temperature sensor 26 is disposed within a sheet passing region on the heater 22 facing a sheet having the smallest width of the plurality of sizes of sheets passing over the end heat generation portion 60B. Disposing the temperature detecting portion 26*a* of the second temperature sensor 26 as described above enables the second temperature sensor 26 to detect temperatures of regions corresponding to all sizes of sheets passing the vicinity of the end heat generation portion 60B.

As illustrated in FIG. 3A, a temperature detecting portion 27*a* of the third temperature sensor 27 is disposed so as to face the central heat generation portion 60A having the width L1 outside the small sheet passing region W1 on the heater 22. In other words, the temperature detecting portion 27*a* of the third temperature sensor 27 is disposed corresponding to a non-sheet passing region for the small sheet P1 that is a region of the central heat generation portion 60A not facing the small sheet P1 when the small sheet P1 passes through the fixing device.

The temperature detecting portion 27*a* of the third temperature sensor 27 disposed as described above detects a temperature of the non-sheet passing region for the small sheet P1 on the central heat generation portion 60A when the small sheet P1 passes through the fixing device.

As illustrated in FIG. 3A, a temperature detection element 55*a* of the safety device 55 is disposed so as to face the center of the central heat generation portion 60A having the width L1. When the runaway control of the heater 22 causes the temperature of the central heat generation portion 60A to be equal to or higher than a threshold value, the temperature detection element 55*a* detects the temperature equal to or higher than the threshold value via the heat-sensitive surface of the safety device 55 and cuts off the current supplied to the heater 22. However, the temperature detection element 55*a* restores the power supply to the heater 22 when the temperature detection element 55*a* detects temperature drop that results in the temperature of the central heat generation portion 60A in the heater 22 to be below the threshold value.

The safety device 55 is disposed adjacent to the first temperature sensor 25. Disconnection of the heat generating block 59 facing the safety device 55 may prevent the safety device 55 from detecting an excessive temperature rise caused by the other heat generating blocks 59 adjacent to the heat generating block 59 disconnected because the other heat generating blocks are coupled in parallel to the power source. Disposing the first temperature sensor 25 adjacent to the safety device 55 enables the first temperature sensor 25 to detect the above-described failure because the first temperature sensor 25 can detect an abnormal temperature drop caused by the disconnection. A fuse may be used as the safety device 55 instead of the thermostat.

The controller receives temperature data detected by the first to third temperature sensors 25, 26, and 27 and individually controls the central heat generation portion 60A and the end heat generation portions 60B based on the temperature data. As a result, the temperature in the fixing nip N is controlled to be a predetermined target temperature (the fixing temperature).

Heat of the sheet passing region of the heater 22 transfers to the sheet passing through the nip, but heat of the non-sheet passing region of the heater 22 does not transfer to the sheet. The heat of the non-sheet passing region is not consumed so much. Accordingly, continuously printing small sheets may cause the excessive temperature rise in the non-sheet passing region. The third temperature sensor 27 detects the above-described excessive temperature rise in the non-sheet passing region. When the third temperature sensor 27 detects the temperature in the non-sheet passing region equal to or higher than the predetermined temperature, the controller performs control for reducing a heat generation amount generated by the heater 22. Decreasing the sheet conveying speed, increasing the sheet conveying interval, or stopping the image formation prevents temperature rise in the non-sheet passing region.

In the present embodiment, the second temperature sensor 26 is disposed so as to face the one end heat generation portion 60B, but the second temperature sensor 26 may also be disposed so as to face the other end heat generation portion 60B. However, the image forming apparatus in the present embodiment is configured by a so-called center conveyance reference system in which various sizes of sheets P1 and P2 are conveyed so that the center positions M of the various sizes of sheets in the width direction pass through a same position in the image forming apparatus. In this case, the temperature distribution of the fixing belt is basically symmetrical with respect to the center position M of the sheet in the width direction of the sheet. For this reason, using the second temperature sensor 26 disposed opposite one end heat generation portion 60B, the controller can control the other end heat generation portion 60B similar to the one end heat generation portion 60B.

In the above-described embodiment, the heater includes a plurality of heat generation portions (that is, the central heat generation portion 60A and the end heat generation portions 60B) that are independently controlled. However, the present disclosure is not limited to the heater including the plurality of heat generation portions. The present disclosure may be applied to a heater including only one heat generation portion. In the above-described embodiment, the temperature sensors 25 to 27 and the safety device 55 are positioned on the holder 23 as the counterpart member. However, the counterpart member is not limited to the holder 23. The temperature sensors 25 to 27 and the safety device 55 may be positioned on another member such as the stay 24. In addition to the safety device 55, the fixing device 9 may include another safety device facing the end heat generation portion 60B and being adjacent to the second temperature sensors 26.

The following describes configurations of the temperature sensors 25 to 27.

Since the temperature sensors 25 to 27 are similarly configured, the configuration of the temperature sensor 25 is described.

Figure 4A:
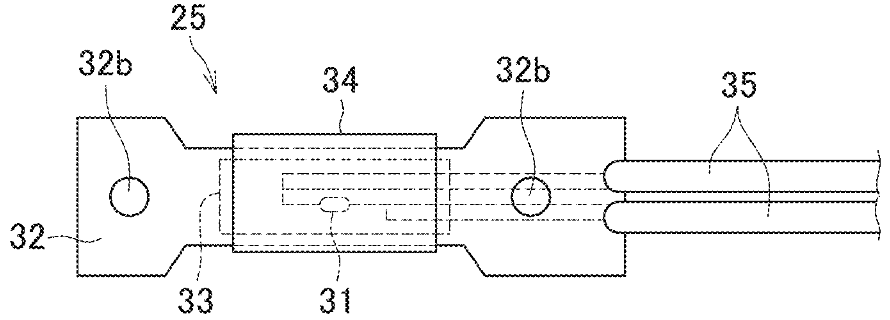
FIG. 4A is a plan view of a temperature sensor.
Figure 4B:
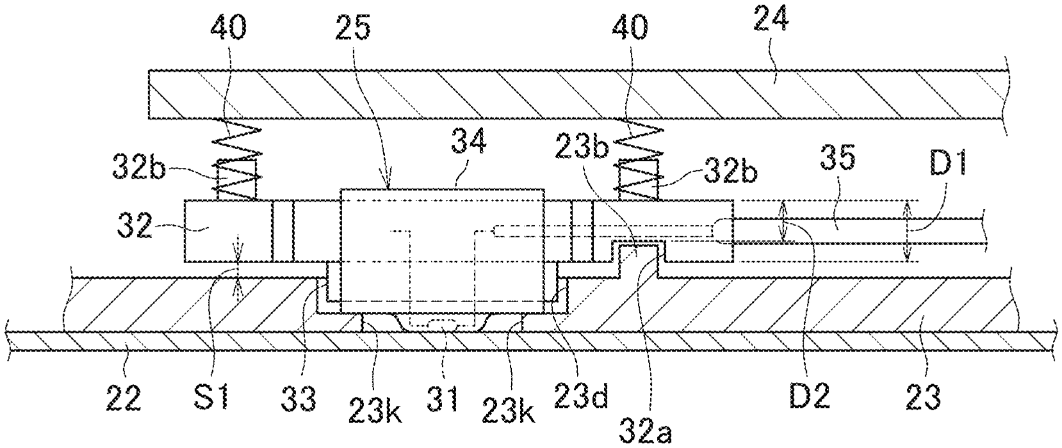
FIG. 4B is a side view of an attachment structure of the temperature sensor of FIG. 4A.
Figure 4C:
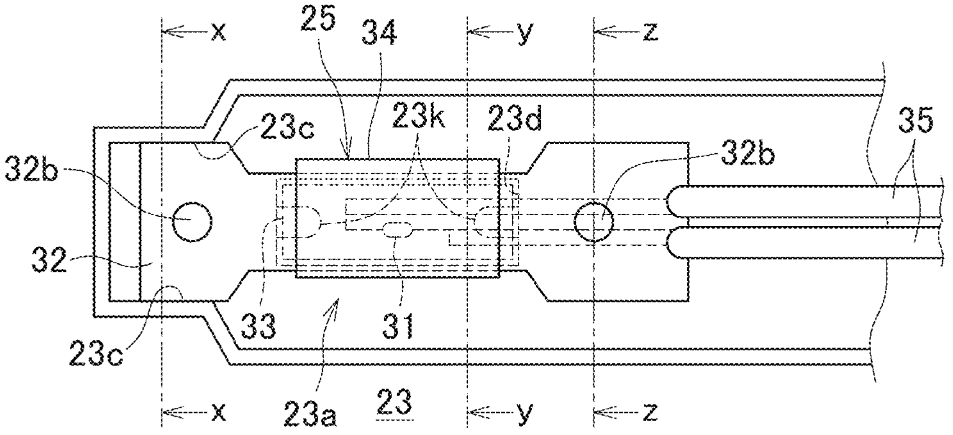
FIG. 4C is a plan view of the attachment structure of the temperature sensor of FIG. 4A.

FIG. 4A is a plan view of the temperature sensor 25, FIG. 4B is a side view of the temperature sensor 25 attached to the holder 23, and FIG. 4C is a plan view of the temperature sensor 25 attached to the holder 23. The temperature sensor 25 includes a temperature detection element 31 that functions as the temperature detecting portion 25*a*, a holding body 32 that holds the temperature detection element 31, a buffer 33 disposed between the temperature detection element 31 and the holding body 32, an insulating sheet 34 that comprehensively covers the temperature detection element 31 together with the holding body 32, and lead wires 35 that are two conductors electrically coupled to the temperature detection element 31.

The holding body 32 is made of resin such as liquid crystal polymer (LCP) having excellent heat resistance. In the case that high heat resistance is required, the buffer 33 is preferably heat-resistant nonwoven fabric or inorganic fiber paper that are made of ceramic fiber sheets. In the case that the high heat resistance is not required, the buffer 33 may be sponge or rubber that are made of silicone resin or fluorine resin.

The temperature detection element 31 is electrically coupled to the controller via the two lead wires 35. The controller controls heat generation of the heater 22. The temperature detection element 31 and the buffer 33 are disposed on the lower surface of the holding body 32 in FIG. 4B.

In the present embodiment, the holding body 32 is an elongated member extending in a lateral direction in FIGS. 4A to 4C. The temperature detection element 31 and the buffer 33 are disposed at the center of the holding body 32 in the longitudinal direction of the holding body 32. In addition, the holding body 32 according to the present embodiment has a center portion narrower than end portions in the longitudinal direction as illustrated in FIGS. 4A and 4C. The temperature detection element 31 and the buffer 33 are disposed at the narrower center portion.

As illustrated in FIG. 4B, projections 32*b* to position coil springs 40 are disposed on the upper surface of the holding body 32. One of the projections is disposed on one of both end portions of the holding body 32 in the longitudinal direction of the holding body 32.

The insulating sheet 34 is attached to the temperature sensor 25 so as to comprehensively wrap the temperature detection element 31, the holding body 32, and the buffer 33. The insulating sheet 34 is made of resin having good properties of insulation, heat resistance, wear resistance, and thermal conductivity, such as polyimide.

The following describes the configuration of the safety device 55.

Figure 12A:
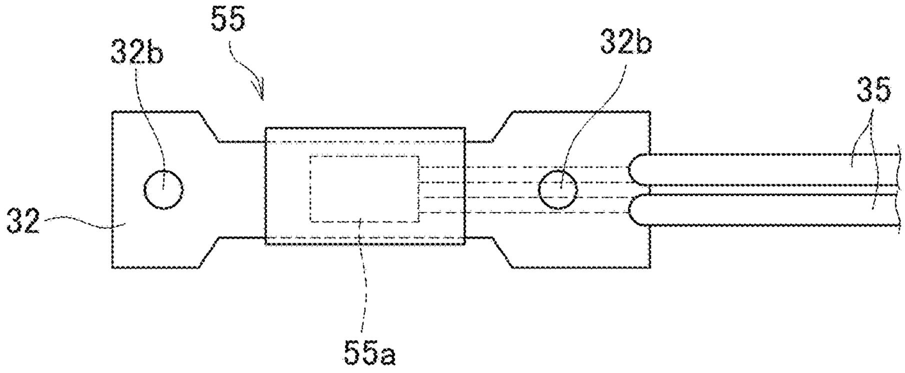
FIG. 12A is a plan view of the safety device.
Figure 12B:
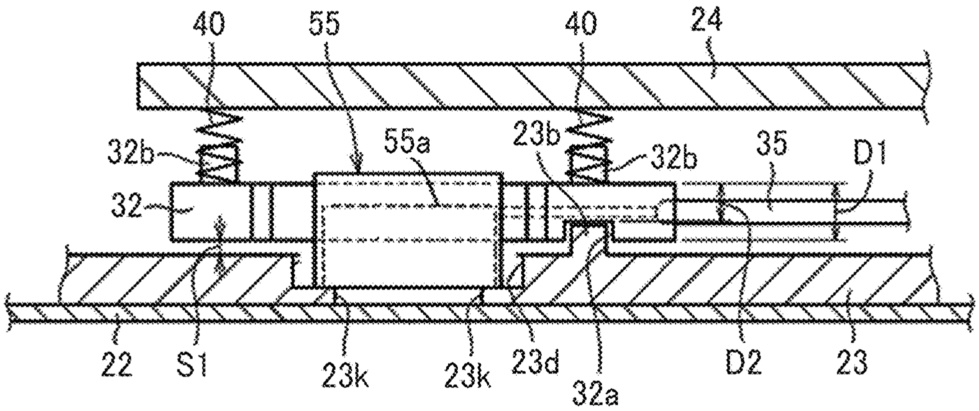
FIG. 12B is a side view of an attachment structure of the safety device of FIG. 12A. The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 12A is a plan view of the safety device 55, and FIG. 12B is a side view of the safety device 55 attached to the holder 23. The safety device 55 includes a temperature detection element 55*a* instead of the temperature detection element 31. Other configurations of the safety device 55 are equivalent to those of the temperature sensor 25. The temperature detection element 55*a* is an element such as a bimetal that detects a temperature of a heat-sensitive surface. The heat-sensitive surface is a surface of the safety device 55, and the surface faces the heater 22. The holding body 32 holds the temperature detection element 55*a*. The temperature detection element 55*a* is electrically coupled to the controller via the two lead wires 35. The controller controls heat generation of the heater 22. The safety device 55 is in a circuit for supplying power to the heater 22 and cuts off power to the heater 22 when the temperature of the heat-sensitive surface exceeds a predetermined temperature. The predetermined temperature is determined in consideration of safety of the fixing device. As illustrated in FIG. 12B, the heat-sensitive surface of the safety device 55 according to the present embodiment is not in contact with the heater 22.

Next, attachment state of the temperature sensor and the safety device is described.

Figure 5A:
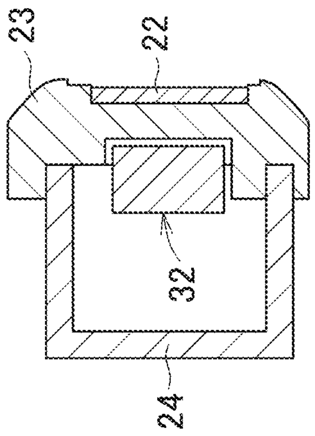
FIG. 5A is a cross-sectional view of the attachment structure, taken along a line x-x in FIG. 4C.
Figure 5B:
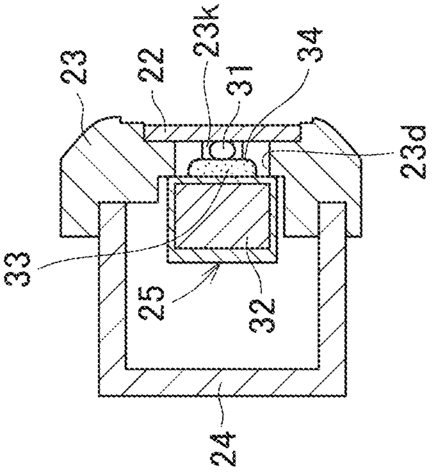
FIG. 5B is a cross-sectional view of the attachment structure, taken along a line y-y in FIG. 4C.
Figure 5C:
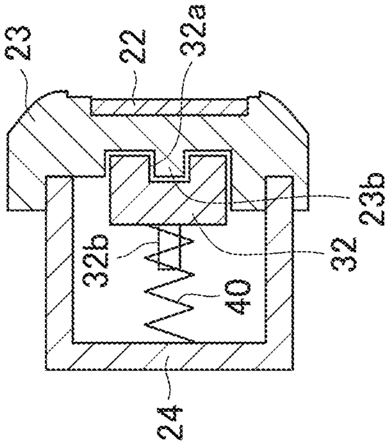
FIG. 5C is a cross-sectional view of the attachment structure, taken along a line z-z in FIG. 4C.

FIGS. 4B, 4C, and SA illustrate a state in which the temperature sensor 25 is attached to the holder 23 as a counterpart member. FIG. 4B is a side view of an attachment structure of the temperature sensor 25, and FIG. 4C is a top view of the attachment structure of the temperature sensor 25. FIG. SA is a cross-sectional view of the attachment structure, taken along a line x-x in FIG. 4C. FIG. 5B is a cross-sectional view of the attachment structure, taken along a line y-y in FIG. 4C. FIG. 5C is a cross-sectional view of the attachment structure, taken along a line z-z in FIG. 4C. In addition, FIG. 4B is a side view of an attachment structure of the safety device 55. Since the temperature sensors 25 to 27 and the safety device 55 have the same attachment structure, the attachment structure of the temperature sensor 25 is described.

As illustrated in FIG. 4C, the temperature sensor 25 is accommodated in a frame-shaped or groove-shaped accommodating section 23*a* disposed in the holder 23. A positioning mechanism of the temperature sensor 25 accommodated in the accommodating section 23*a* is as follows. As illustrated in FIG. 4B and FIG. 5C, the temperature sensor 25 has a concave engagement portion 32*a*, the holder 23 has a convex engagement portion 23*b*. Inserting the convex engagement portion 23*b* into the concave engagement portion 32*a* restricts the position of the temperature sensor 25 with respect to the holder 23. In other words, the concave engagement portion 32*a* and the convex engagement portion 23*b* engaging with each other restricts movement of the temperature sensor 25 in a direction intersecting the axial direction of the convex engagement portion 23*b*. Details of the positioning mechanism are described later.

As illustrated in FIG. 4C, side surfaces of the end portion of the holding body 32 of the temperature sensor 25 accommodated in the accommodating section 23*a* engage to side wall surfaces 23*c* of the accommodating section 23*a* facing each other, respectively. As illustrated in FIGS. 4B and 4C, the end portion having the side surfaces that engage to the side wall surfaces 23*c* is opposite to the end portion having the concave engagement portion 32*a* of the holding body 32. The above-described configuration restricts rotation of the holding body 32 about the convex engagement portion 23*b*. Restricting the movement and rotation of the holding body 32 with respect to the holder 23 as described above positions the temperature sensor 25.

A cross-sectional shape of each of the concave engagement portion 32*a* and the convex engagement portion 23*b* may be a triangle, a quadrangle, or another polygon in addition to a circle. The concave engagement portion 32*a* and the convex engagement portion 23*b* that have polygonal cross-sectional shapes can restrict the rotation of the holder 23 around the convex engagement portion 23*b*.

In the present embodiment, providing the concave engagement portion 32*a* in the end portion of the holding body 32 from which the lead wires 35 extend (that is the right end portion of the holding body 32 in FIG. 4B) improves workability of a work in which a worker grips exposed portions of the lead wires 35 and assembles the safety device 55 or the temperature sensor 25. Since a position in which the worker grips the lead wires 35 is near the concave engagement portion 32*a*, the worker easily aligns the concave engagement portion 32*a* on the convex engagement portion 23*b* to insert the convex engagement portion 23*b* into the concave engagement portion 32*a*. As a result, the assembly work becomes easy.

Depending on the shape of a counterpart member to which the temperature sensor 25 is attached and the layout of members around the temperature sensor 25, the concave engagement portion 32*a* may be disposed in the left end portion of the holding body 32 in FIG. 4B, that is, the end portion of the holding body 32 from which the exposed lead wires 35 do not extend, contrary to the above-described embodiment.

As illustrated in FIGS. 4B and 4C, the holder 23 has a through hole 23*d* near the convex engagement portion 23*b*. The temperature detection element 31 and parts of the temperature sensor 25 around the temperature detection element 31 are disposed in the through hole 23*d*. The temperature detection element 31 and the like (including the buffer 33 and the insulating sheet 34) are disposed in the through hole 23*d*, and the temperature detection element 31 comes into contact with the heater 22 via the insulating sheet 34. Alternatively, a high thermal conduction member (a thermal equalizer) made of aluminum, graphite, or the like may be disposed between the temperature detection element 31 and the heater 22 so that the temperature detection element 31 is in contact with the heater 22 via the high thermal conduction member (and an insulating sheet 34 or the like).

On the other hand, the safety device 55 according to the present embodiment is disposed so as not to come into contact with the heater 22 as illustrated in FIG. 12B.

Next, step portions disposed in the through hole are described.

Step portions 23*k* are disposed on a plurality of positions on an inner circumferential edge of the through hole 23*d* adjacent to the heater 22. As illustrated in FIGS. 4B, 4C and 12B, a pair of step portions 23*k* extends from two portions of the holder 23 in the longitudinal direction of the holder 23 in the present embodiment, and the two portions face each other.

Each of the pair of step portions 23*k* extends toward the mating step portion 23*k* in the longitudinal direction of the holder 23. The pair of step portions 23*k* support both ends of the insulating sheet 34 of the temperature sensor 25. The pair of step portions 23*k* support both ends of the safety device 55. In other words, the step portion 23*k* supports the outer end of the safety device 55. The temperature detection element 31 is in contact with the back surface of the heater 22 at an intermediate position between the pair of step portions 23*k*.

In FIG. 4B and FIG. 12B, the stay 24 as a support supports a pair of coil springs 40 as a biasing member that biases the safety device 55 or the temperature sensor 25. The pair of coil springs 40 biases the temperature sensor 25 toward the heater 22 and the holder 23. As a result, a certain pressure presses the temperature detection element 31 against the back surface of the heater 22 via the insulating sheet 34. The pair of coil springs 40 biases the safety device 55 toward the heater 22 and the holder 23. As a result, a certain pressure fixes the safety device 55 on the step portions 23*k*.

The ends of the coil springs 40 are positioned by the two projections 32*b*, respectively. The two projections 32*b* are disposed on the safety device 55 or the temperature sensor 25. Inserting the projections 32*b* into ends of the coil springs 40 to position the coil springs 40, respectively prevents positional deviations of the coil springs 40 and buckling the coil springs 40. As a result, the coil springs 40 can apply a stable contact pressure to the safety device 55 or the temperature sensor 25.

The buffer 33 disposed between the temperature detection element 31 and the holding body 32 ensures pressing the temperature detection element 31 against the heater 22 via the insulating sheet 34. The temperature sensor 25, the holder 23, and the like have dimensional tolerances in the vertical direction in FIG. 4B. In accordance with the dimensional tolerances, the buffer 33 is elastically deformed (that is, compressed). As a result, the certain contact pressure presses the temperature detection element 31 against the heater 22, and the temperature detection element 31 is in contact with the heater 22 via the buffer 33. In order to allow elastic deformation (that is, compressive deformation) of the buffer 33, a clearance S1 is designed between the holder 23 and the holding body 32 of the temperature sensor 25. Although the safety device 55 according to the present embodiment does not include the buffer 33, a clearance S1 is designed between the holder 23 and the holding body 32 of the safety device 55 to cancel dimensional tolerances of the safety device 55 and the holder 23 in the vertical direction of FIG. 12B.

The buffer 33 is made of a material having lower thermal conductivity and lower rigidity than those of the holding body 32 to have elasticity and thermal insulation. Accordingly, the buffer 33 also functions as a heat insulator that reduces heat transmitted from the heater 22 to the holding body 32.

The following describes the positioning mechanism of the safety device 55 and the temperature sensor 25.

As illustrated in FIG. 4B, the holding body 32 has the concave engagement portion 32*a* as an engaged portion in the side facing the heater 22 on which the temperature detection element 31 and the buffer 33 are disposed. The convex engagement portion 23*b* of the holder 23 as the counterpart member engages the concave engagement portion 32*a* as the engaged portion. The concave engagement portion 32*a* is disposed in one end of the holding body 32 in the longitudinal direction of the holding body 32, and the exposed lead wires 35 are attached to the one end.

Figure 4D:
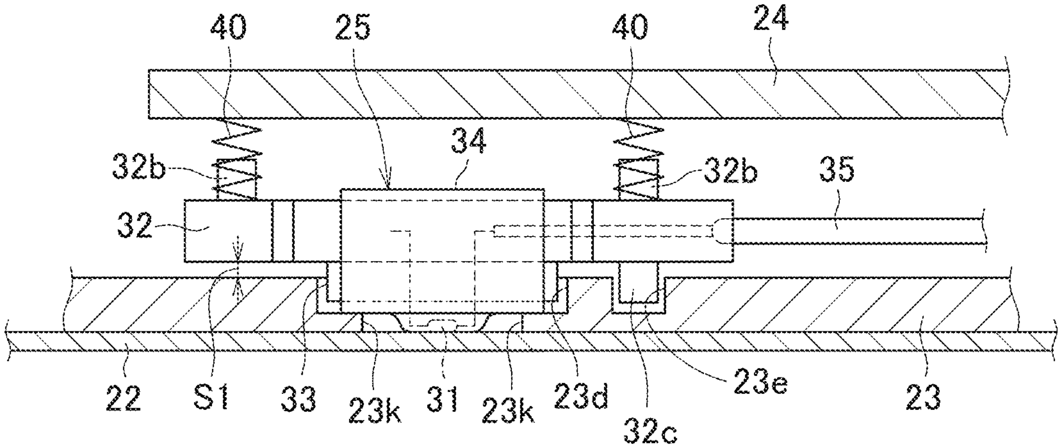
FIG. 4D is a side view of another attachment structure of the temperature sensor of FIG. 4A.

The convex engagement portion 23*b* and the concave engagement portion 32*a* form the positioning mechanism for positioning the temperature sensor 25 at a predetermined position with respect to the heater 22 and the holder 23. The concave-convex engagement structure of the positioning mechanism may be reversed between the holding body 32 of the temperature sensor 25 and the holder 23. As illustrated in FIG. 4D, the holder 23 may have a concave engagement portion 23*e* as an engaging portion, and the holding body 32 of the temperature sensor 25 may have a convex engagement portion 32*c* as the engaged portion to be engaged with the concave engagement portion 23*e*.

The positioning mechanism is not limited to the concave-convex engagement structure formed on the mutually facing surfaces of the holder 23 and the holding body 32 as illustrated in FIG. 4B and FIG. 4D. For example, a part of the positioning mechanism may be configured by the side wall surfaces 23*c* facing each other on the accommodating section 23*a* of the holder 23 as illustrated in FIG. 4C. The safety device 55 may have the positioning mechanism as described above.

The following describes the attachment structure of the safety device 55.

Figure 5D:
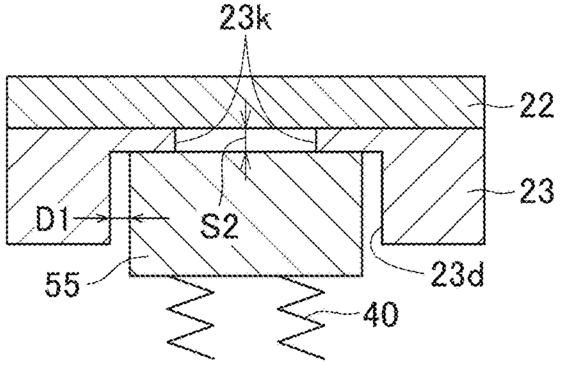
FIG. 5D is a cross-sectional view of an attachment structure of a safety device attached to the holder according to a first embodiment.
Figure 5E:
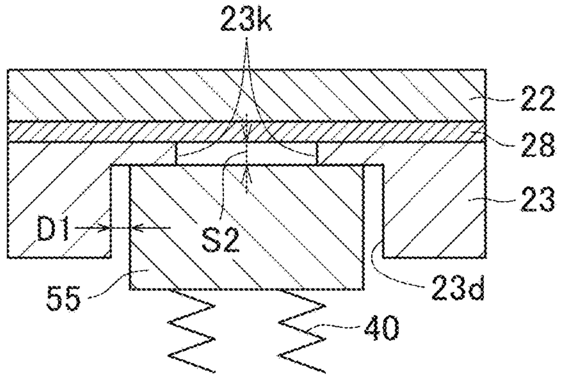
FIG. 5E is a cross-sectional view of an attachment structure of the safety device attached to the holder according to a second embodiment.
Figure 5F:
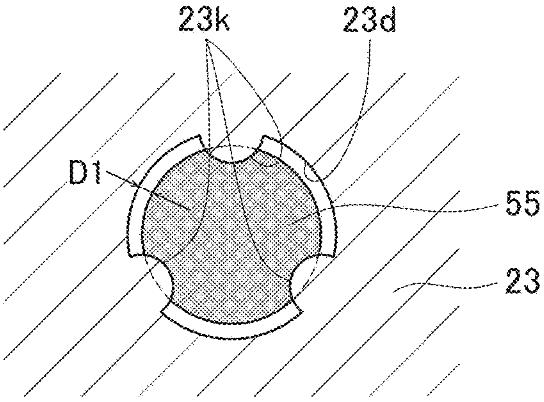
FIG. 5F is a cross-sectional view of an attachment structure of the safety device attached to the holder according to a third embodiment.
Figure 5G:
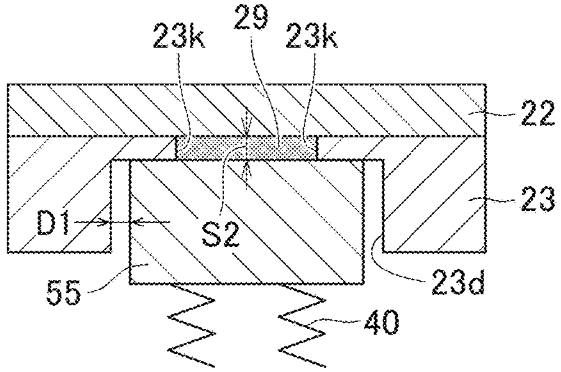
FIG. 5G is a cross-sectional view of an attachment structure of the safety device attached to the holder according to a fourth embodiment.
Figure 5H:
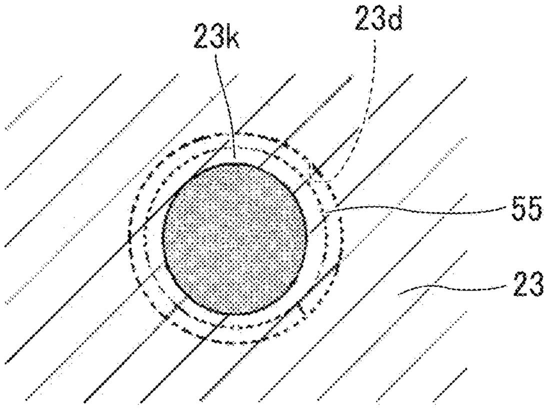
FIG. 5H is a cross-sectional view of an attachment structure of the safety device attached to the holder according to a fifth embodiment.

FIGS. 5D to 5H are cross-sectional views of the safety device 55 attached to the holder 23 to illustrate the attachment structure of the safety device 55. FIG. 5D is the cross-sectional view of the safety device 55 attached to the holder 23 according to a first embodiment, FIG. 5E is the cross-sectional view of the safety device 55 attached to the holder 23 according to a second embodiment, FIG. 5F is the cross-sectional view of the safety device 55 attached to the holder 23 according to a third embodiment, FIG. 5G is the cross-sectional view of the safety device 55 attached to the holder 23 according to a fourth embodiment, and FIG. 5H is the cross-sectional view of the safety device 55 attached to the holder 23 according to a fifth embodiment. FIGS. 5F and 5H are the cross-sectional views of the safety device 55 seen from the back surface of the heater 22.

Each of the attachment structures illustrated in FIGS. 5D to 5H has a slight clearance S2 between the back surface of the heater 22 and a central portion of the heat-sensitive surface of the safety device 55. The heat-sensitive surface of the safety device 55 in the present embodiments is a surface facing the heater 22 as a target member in which the safety device 55 detects the temperature and the surface supported by the holder 23. Due to the clearance S2, the central portion of the heat-sensitive surface of the safety device 55 and the heater 22 are not in contact with each other. In order to form the clearance S2, the holder 23 has the plurality of step portions 23*k* formed at a plurality of positions on the inner circumferential surface of the through hole 23*d* or one step portion having a ring shape projected from the inner circumferential surface of the through hole 23*d* as illustrated in FIG. 5H. In a section perpendicular to the sheet surface of FIG. 5H, the attachment structure illustrated in FIG. 5H has the same cross-sectional shape as the cross-sectional shape illustrated in FIG. 5D The step portions 23*k* are integrally molded with the holder 23 so as to project from the inner circumferential surface of the through hole 23*d* and be adjacent to the heater 22. As illustrated in FIGS. 5D, 5E, and 5G, the step portions 23*k* may be formed at two positions in the longitudinal direction of the holder 23 so as to face each other.

As illustrated in FIG. 5E, the attachment structure according to the second embodiment includes a thermal equalizer 28 disposed between the heater 22 and the holder 23. Since the temperature of the heater 22 is transmitted to the heat-sensitive surface of the safety device 55 via the thermal equalizer 28, the detection accuracy of the safety device 55 can be stabilized.

As illustrated in FIG. 5F, the attachment structure according to the third embodiment includes the holder 23 having three step portions 23*k*. The three step portions 23*k* are formed at equal intervals in the circumferential direction of the through hole 23*d* having a cylindrical shape. The three step portions formed at equal intervals in the circumferential direction stabilize the posture of the safety device 55 attached to the holder 23 and uniform the clearance between the back surface of the heater 22 and the safety device 55 without deviation. The above-described structure can improve the heat transfer from the heater 22 to the heat-sensitive surface of the safety device 55 and the response of the safety device 55. The attachment structure according to the fifth embodiment illustrated in FIG. 5H has the same advantage as described above.

In the heat-sensitive surface of the safety device 55, a ratio of an area Sa not in contact with the step portion 23*k* to an area Sb in contact with the step portion 23*k* is preferably 5 or more ($5 \leq Sa/Sb$). When the ratio Sa/Sb is less than 5, too large area Sb in contact with the step portion 23*k* increases the amount of heat escaping from the heater 22 to the safety device 55, which may cause a fixing failure. The step portion 23*k* is in contact with a region of the heat-sensitive surface of the safety device 55, and the region is preferably within 2 mm from the outer peripheral edge toward the inner portion of the heat-sensitive surface. If a region of the heat-sensitive surface of the safety device 55 extending inward beyond the 2 mm from the outer peripheral edge abuts against the step portion 23*k*, the amount of heat escaping from the heater 22 to the safety device 55 may increase to cause fixing failure or deteriorate the detection accuracy of the temperature detection element 55*a*. As illustrated in FIGS. 5D to 5G, a clearance D1 between the outer wall of the safety device 55 and the inner circumferential surface of the through hole 23*d* is desirably less than 2 mm. Too large clearance D1, that is, too large through hole may cause uneven temperature distribution in the heater.

As illustrated in FIG. 5G, the attachment structure according to the fourth embodiment includes a material 29 having fluidity interposed in the clearance S2 between the heater 22 and the safety device 55. That is, the clearance S2 may be an air layer as illustrated in FIGS. 5D and 5E, or the clearance S2 may be filled with the material 29 having fluidity as illustrated in FIG. 5G. Both structures can eliminate heat transfer variation due to the contact state between solids.

In general, lubricant is applied to the surface of the heater 22 in order to reduce friction between the surface of the heater 22 and the fixing belt 20. The lubricant may enter the safety device 55. The lubricant entering the clearance S2 in FIGS. 5D and 5E changes a heat transfer state of the safety device 55.

Filling the space between the heater 22 and the safety device 55 with the material 29 having fluidity prevents the heat transfer state from changing and, as a result, prevents deterioration in the detection accuracy of the temperature detection element 55*a*. The material 29 having fluidity includes a semi-solid material such as grease.

FIGS. 10A and 10B are cross-sectional views of attachment structures of the safety device 55 attached to the holder 23 according to first and second comparative embodiments. In the first comparative embodiment illustrated in FIG. 10A, the entire surface including the heat-sensitive surface of the safety device 55 is in direct contact with the back surface of the heater 22. In the second comparative embodiment illustrated in FIG. 10B, the entire surface including the heat-sensitive surface of the safety device 55 is in contact with a thin portion 231 of the holder 23 on the back surface of the heater 22.

Direct contact between the entire surface including the heat-sensitive surface of the safety device 55 and the back surface of the heater 22 as illustrated in FIG. 10A improves the response of the safety device 55 but increases the amount of heat escaping from the heater 22 to the safety device 55. In addition, the above-described attachment structure causes inevitable variation in the solid contact state between the heater 22 and the safety device 55 that causes heat transfer variation, and the heat transfer variation varies the response of the safety device 55.

In the second comparative embodiment illustrated in FIG. 10B, the attachment structure in which the entire surface including the heat-sensitive surface of the safety device 55 is in contact with the thin portion 231 of the holder 23 on the heater 22 has a problem in injection molding of the holder 23 in addition to the above-described variation of the response of the safety device 55. That is, it is difficult to evenly fill the injection molding mold of the thin portion 231 with resin (resin-short). To avoid the above-described problem, there is a limit in thinning the thin portion 231, and the response of the safety device is sacrificed.

With reference to FIGS. 11A to 11G, the attachment structure of the safety device 55 according to a third comparative embodiment.

Figure 11A:
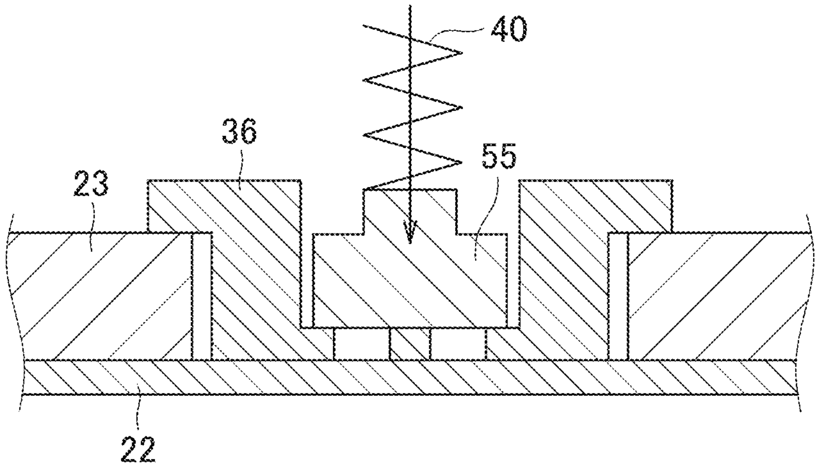
FIG. 11A is a cross-sectional view of an attachment structure of the safety device attached to the holder according to a third comparative embodiment.
Figure 11B:
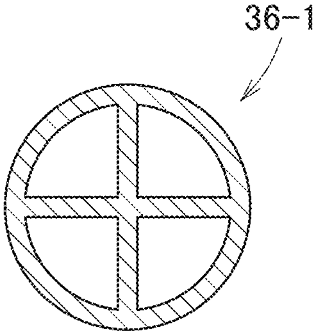
FIGS. 11B to 11E are plan views of various types of spacers of the attachment structure of FIG. 11A.
Figure 11C:
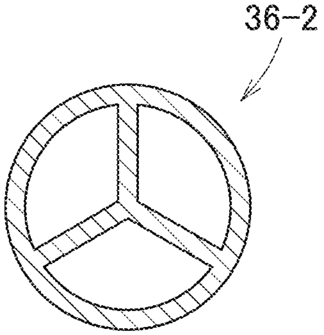
Figure 11D:
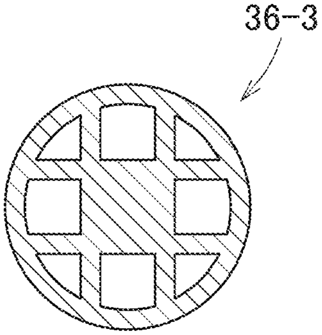
Figure 11E:
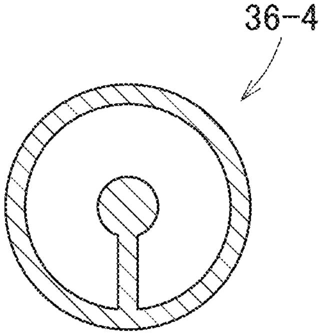
Figure 11F:
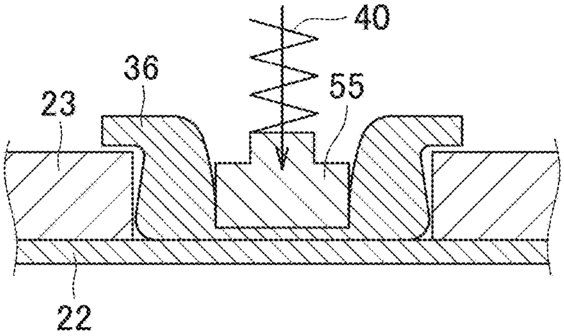
FIG. 11F is a cross-sectional view of the spacer interposed between the safety device and the holder according to the third comparative embodiment before runaway control of the heater melts the spacer.
Figure 11G:
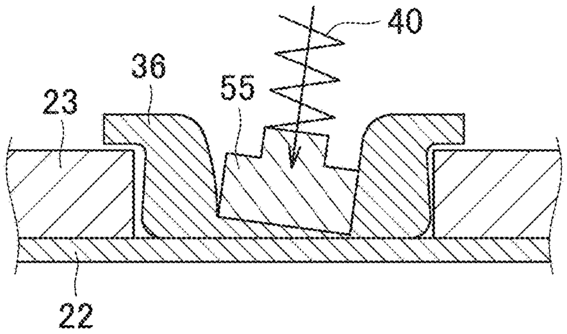
FIG. 11G is a cross-sectional view of the spacer interposed between the safety device and the holder according to the third comparative embodiment after the runaway control of the heater melts the spacer.

As illustrated in FIG. 11A, the attachment structure of the safety device 55 according to a third comparative embodiment includes a spacer 36 interposed between the safety device 55 and the heater 22 serving as a heating member. Like the spacers 36-1 to 36-4 illustrated in FIGS. 11B to 11E, the spacer 36 has a frame and a leg portion extending inward from the frame. The frame and the leg portion forms an opening. The opening reduces a contact area in which the spacer 36 is in contact with the heater 22. Abnormal temperature rise in the heater 22 softens and melts the spacer 36. As a result, the safety device 55 comes into contact with the heater 22 via the melted leg portion and is activated to cut off the current flowing to the heater 22. However, the attachment structure of the safety device 55 according to the third comparative embodiment includes the spacer 36 as a separate member interposed between the heater and a center of the heat-sensitive surface of the safety device 55. For this reason, variations in the shapes of both the safety device and the spacer cause a variation in the contact state between the safety device 55 and the leg portion of the spacer 36 and a variation in the contact state between the leg portion and the heater 22, respectively, under the state in which the spacer 36 does not melt as illustrated in FIG. 11F. The above-described variations in the contact states cause variations in the time until the runaway control of the heater 22 starts melting the leg portions of the spacer as illustrated in FIG. 11G. As a result, the safety device cannot stably cut off the current flowing to the heater 22 in response to the runaway control of the heater 22.

In the embodiments illustrated in FIGS. 5D to 5G, the heat-sensitive surface of the safety device 55 is not in contact with the heater 22. The air layer exists between the heater 22 and the heat-sensitive surface of the safety device 55. The above-described attachment structures improve the response of the safety device 55 and solves the problems of variation of the response of the safety device 55 and the heat transfer variation from the heater 22 to the safety device 55 due to the variation in the solid contact state between the heater 22 and the safety device 55.

To form the air layer, the step portions 23*k* of the holder 23 in FIGS. 5D to 5G support the outer peripheral edge of the heat-sensitive surface of the safety device 55. Since the step portion 23*k* is short and narrow, thinning the step portion 23*k* is easy. Thinning the step portion 23*k* enables the safety device 55 to be closer to the heater 22 and improves the response of the safety device 55. As a result, the safety device 55 can stably cut off current flowing the heater 22 in response to the runaway control of the heater 22.

Next, the positioning mechanism of the safety device and the temperature sensor is described. In addition to the above-described positioning mechanism of the safety device and the temperature sensor illustrated in FIGS. 4A to 4D and 12B, the safety device and the temperature sensor may be positioned by a plurality of types of engagement structures in FIGS. 6A to 6E.

Figure 6A:
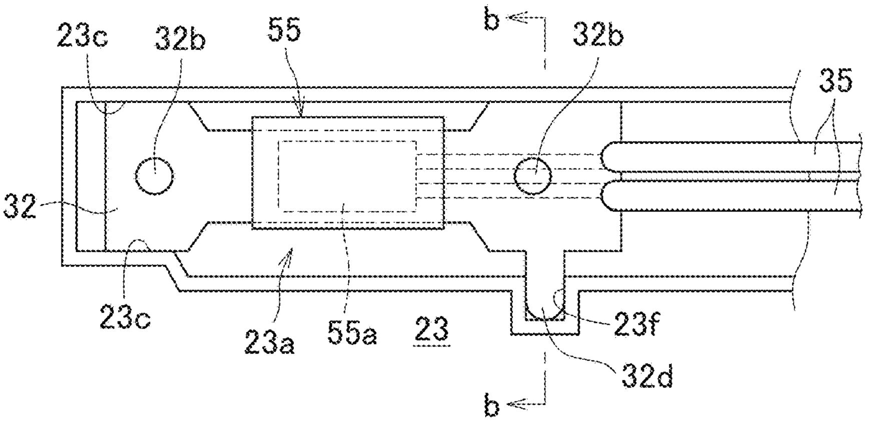
FIG. 6A is a plan view of an engagement structure including a convex engagement portion projecting in a width direction of a holding body that holds the safety device.
Figure 6B:
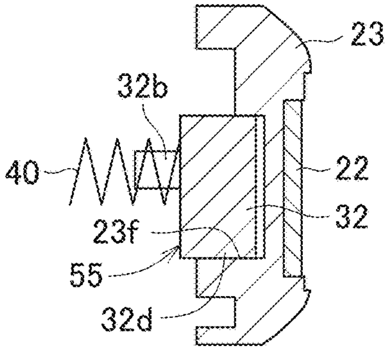
FIG. 6B is a cross-sectional view of the engagement structure of FIG. 6A, taken along a line b-b in FIG. 6A.

In FIGS. 6A and 6B, the holding body 32 has a convex engagement portion 32*d* projecting from one side of the holding body 32 in a width direction of the holding body 32. The convex engagement portion 32*d* engages with the concave engagement portion 23*f* of the holder 23.

Figure 6C:
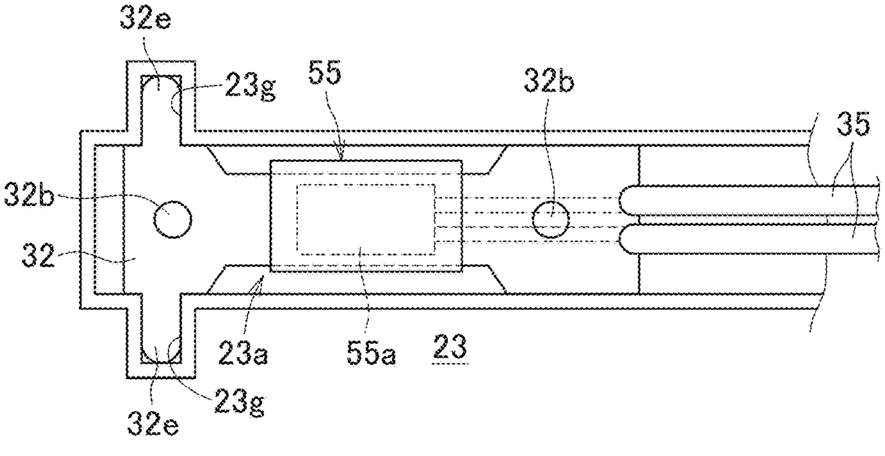
FIG. 6C is a plan view of another engagement structure including convex engagement portions projecting in the width direction of the holding body that holds the safety device.

In FIG. 6C, the holding body 32 has convex engagement portions 32*e* disposed on one end portion of the holding body 32 in the longitudinal direction, the one end portion to which the lead wires 35 are not attached. The convex engagement portions 32*e* project from both sides of the one end portion toward outside. The convex engagement portions 32*e* engage with the concave engagement portions 23*g* of the holder 23. The holding body 32 may have the positioning mechanism illustrated in FIGS. 6A and 6B or the positioning mechanism illustrated in FIG. 6C on both end portions of the holding body 32 in the longitudinal direction.

Figure 6D:
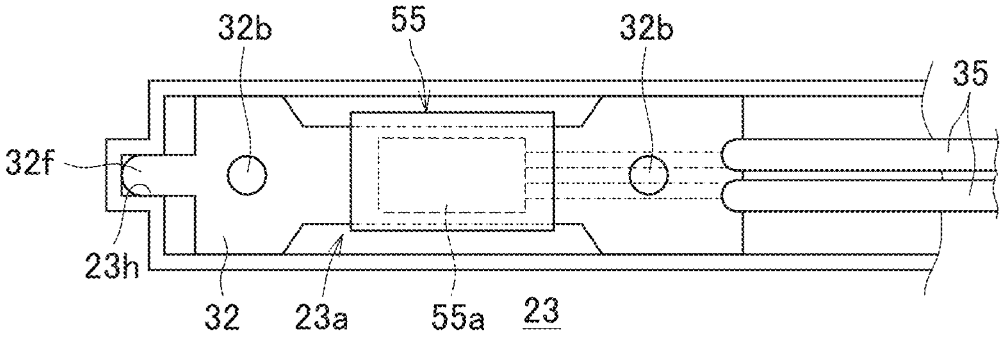
FIG. 6D is a plan view of an engagement structure including a convex engagement portion projecting in a longitudinal direction of the holding body that holds the safety device.

In FIG. 6D, the holding body 32 has a convex engagement portion 32*f* projecting from one end portion of the holding body 32 in the longitudinal direction of the holding body 32. The convex engagement portion 32*e* engages with the concave engagement portion 23*h* of the holder 23.

Figure 6E:
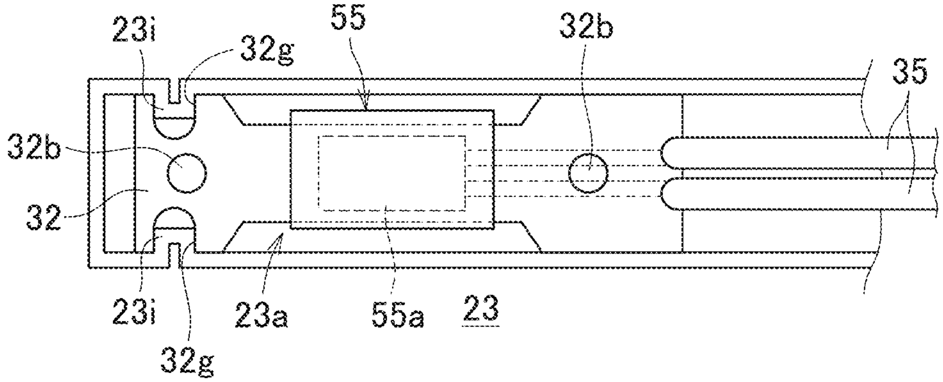
FIG. 6E is a plan view of an engagement structure including concave engagement portions formed on both sides of the holding body in the width direction.

In FIG. 6E, the holding body 32 has concave engaging portions 32*g* formed on one end portion of the holding body 32 in the longitudinal direction. The concave engagement portions 32*g* are disposed on both sides of the one end portion in the width direction of the holding body 32. The concave engagement portions 32*g* engage with the convex engagement portions 23*i* of the holder 23, respectively. The above-described positioning mechanism may be provided on both end portions of the holding body 32 in the longitudinal direction of the holding body 32.

Figure 6F:
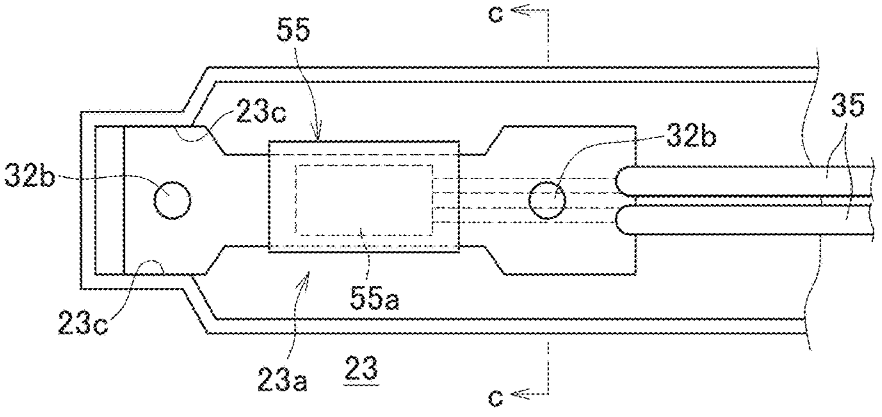
FIG. 6F is a plan view of an engagement structure including a convex engagement portion projecting toward the heater in a thickness direction of the holding body that holds the safety device.
Figure 6G:
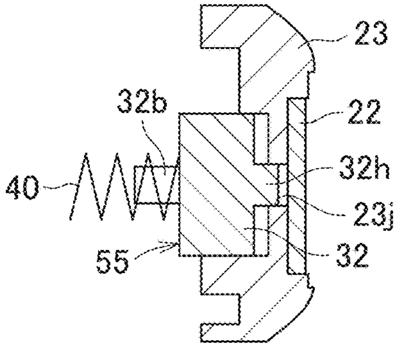
FIG. 6G is a cross-sectional view of the engagement structure of FIG. 6F, taken along a line c-c in FIG. 6G.

As illustrated in FIG. 6F, one end portion of the holding body 32 in the longitudinal direction has both sides in the width direction that engage the side wall surfaces 23*c* of the accommodating section 23*a* facing each other. In addition, as illustrated in FIG. 6G, the other end portion of the holding body 32 in the longitudinal direction has a convex engagement portion 32*h* projecting from heater side surface of the holding body 32. The convex engagement portion 32*h* engages with the concave engagement portion 23*j* of the holder 23.

As described above, the safety device 55 may be positioned by at least one of the various types of the positioning mechanisms. In any of the positioning mechanisms, the engagement width in the thickness direction of the holding body 32 (that is the biasing direction of the coil spring 40) is very short.

Figure 7A:
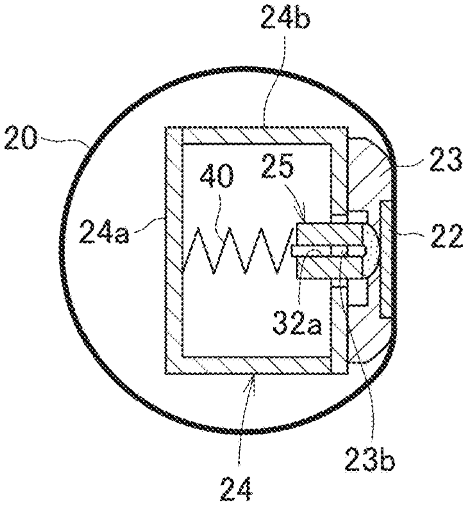
FIG. 7A is a cross-sectional view of a stay that is different from the stay of FIG. 2D.
Figure 7B:
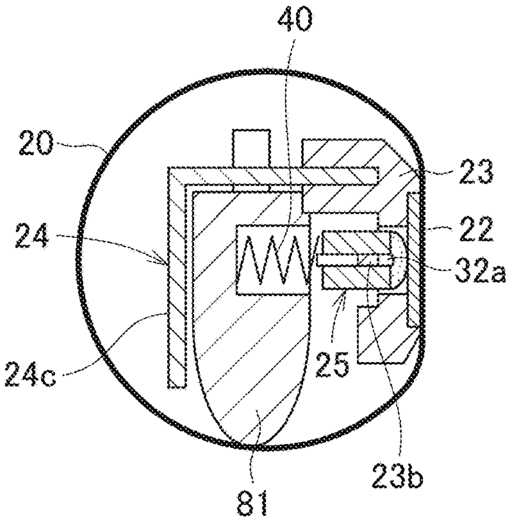
FIG. 7B is a cross-sectional view of a stay that is different from the stays of FIGS. 2D and 7A.
Figure 7C:
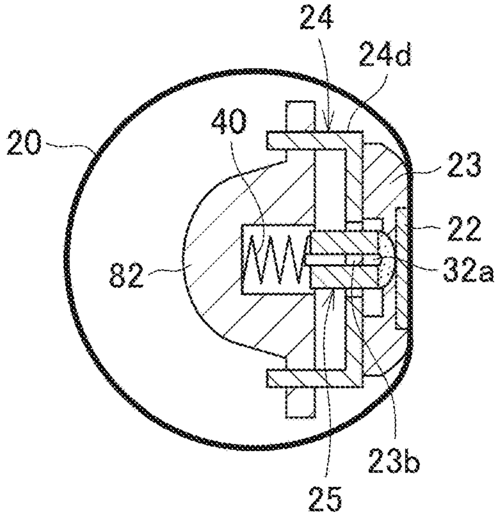
FIG. 7C is a cross-sectional view of a stay that is different from the stays of FIGS. 2D, 7A, and 7B.

The above-described stay 24 may be any one of various types of stays as illustrated in FIGS. 7A to 7C.

The stay 24 illustrated in FIG. 7A is made by swaging two L-shaped angle members 24*a* and 24*b* and welding or screwing them. Both ends of the holder 23 in the short-side direction of the holder 23 are brought into contact with the stay 24, thereby reducing a heat transfer area and heat loss.

The stay 24 illustrated in FIG. 7B is made of one L-shaped angle member 24*c*. The stay 24 is brought into contact with one end portion of the holder 23 in the short-side direction of the holder 23, whereby the heat transfer area is further reduced to decrease thermal loss. A spring holder 81 that also serves as a belt guide is fixed to the stay 24.

The stay 24 illustrated in FIG. 7C is made of one channel-shaped angle member 24*c*. The stay 24 is brought into contact with both end portions of the holder 23 in the short-side direction of the holder 23, whereby the heat transfer area is reduced to decrease thermal loss. A spring holder 82 that also serves as the belt guide is fixed to the stay 24.

Figure 8A:
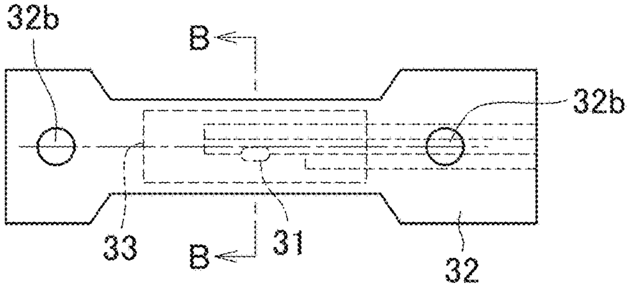
FIG. 8A is a plan view of an arrangement of a temperature detection element and points at which coil springs apply forces to the temperature sensor, which are arranged on a straight line.

As illustrated in FIG. 8A, the temperature detection element 31 may be disposed on a line extending in the longitudinal direction of the holding body 32 and connecting the positions of the above-described projections 32*b* for positioning the coil springs 40. Thus, the biasing forces of the coil springs 40 can be directly applied to the temperature detection element 31, and the pressing force suitable for accurate temperature detection can be stably maintained. Similarly, the convex engagement portion 23*b* and the concave engagement portion 32*a* in FIGS. 7A to 7C may also be disposed on the line extending in the longitudinal direction of the holding body 32 and connecting the positions of the above-described projections 32*b* in FIG. 8A.

Figure 8B:
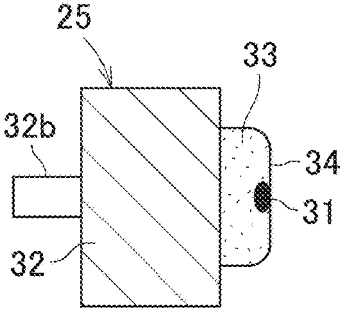
FIG. 8B is a cross-sectional view taken along line B-B in FIG. 8A.

As illustrated in FIG. 8B, the temperature detection element 31 and the buffer 33 are covered with the insulating sheet 34. The temperature detection element 31 is disposed on the buffer 33. In the present embodiment illustrated in FIGS. 8A and 8B, the temperature sensor 25 has a thickness of 4 mm, and the buffer 33 and the insulating sheet 34 has a thickness of 1 mm and a width of 4 mm in a natural state.

Acting a nip pressure on the front surface of the temperature sensor 25 that is not inclined reduces the thickness of the buffer 33 to 0.4 mm uniformly in the width direction. Since the uniform compressive force (6 kPa) of the buffer 33 acts on the temperature detection element 31, the temperature detection element 31 can accurately detect the temperature of the heater 22.

Next, other types of fixing devices are described.

Figure 9A:
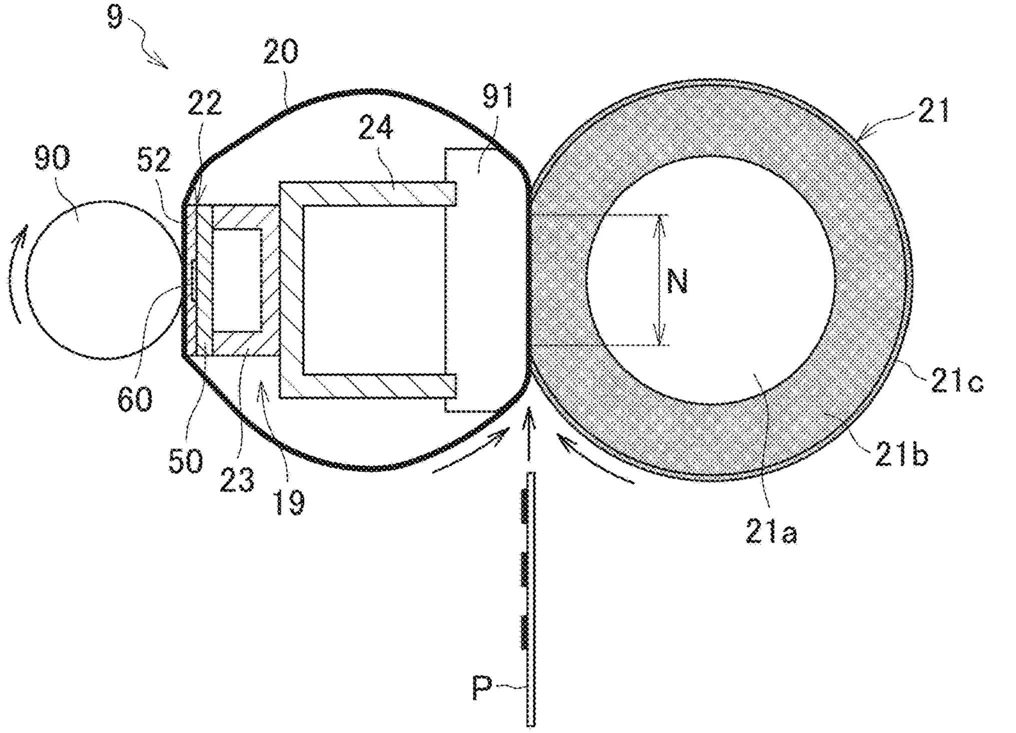
FIG. 9A is a schematic cross-sectional view of a fixing device having a structure different from the fixing device of FIG. 2A.
Figure 9B:
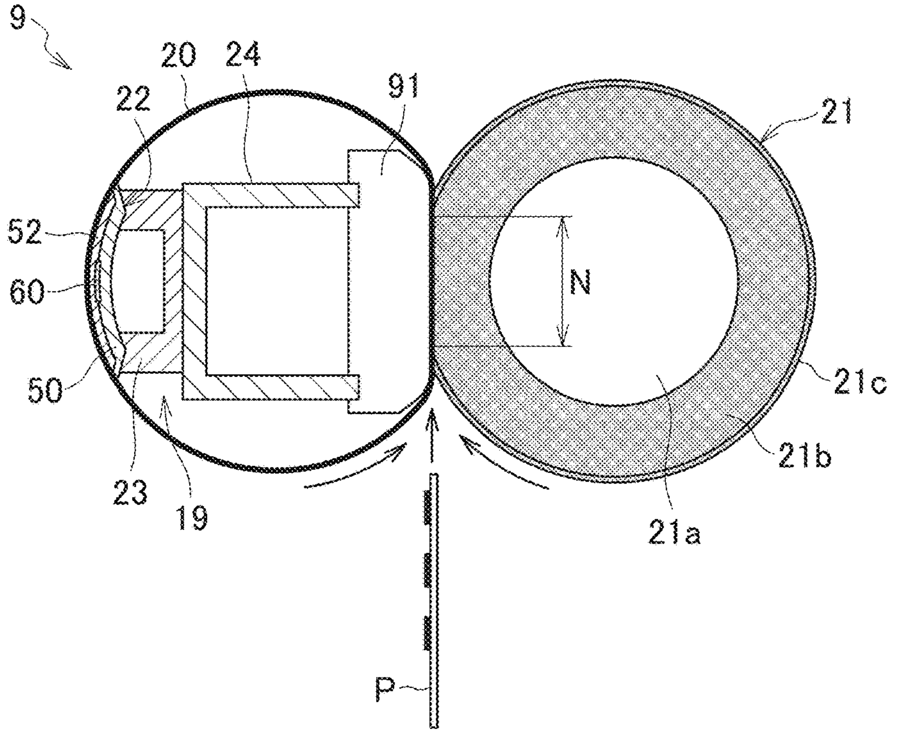
FIG. 9B is a schematic cross-sectional view of a fixing device having a structure different from the fixing devices of FIGS. 2A and 9A.

The present disclosure is applicable to fixing devices illustrated in FIGS. 9A to 9C in addition to the above-described fixing devices. The fixing devices illustrated in FIGS. 9A to 9C are briefly described below.

First, the fixing device 9 illustrated in FIG. 9A includes a pressurization roller 90 opposite the pressure roller 21 with respect to the fixing belt 20 and heats the fixing belt 20 sandwiched by the pressurization roller 90 and the heater 22. On the other hand, a nip formation pad 91 is disposed inside the loop formed by the fixing belt 20 and disposed opposite the pressure roller 21. The stay 24 supports the nip formation pad 91. The nip formation pad 91 and the pressure roller 21 sandwich the fixing belt 20 and define the fixing nip N.

Next, the fixing device 9 illustrated in FIG. 9B omits the above-described pressurization roller 90 and includes the heater 22 formed to be arc having a curvature of the fixing belt 20 to keep a circumferential contact length between the fixing belt 20 and the heater 22. Other parts of the fixing device 9 illustrated in FIG. 9B are the same as the fixing device 9 illustrated in FIG. 9A.

Lastly, the fixing device 9 illustrated in FIG. 9C includes a pressing belt 92 in addition to the fixing belt 20 and has a heating nip (a first nip) N1 and the fixing nip (a second nip) N2 separately. That is, the nip formation pad 91 and the stay 93 are disposed opposite the fixing belt 20 with respect to the pressure roller 21, and the pressing belt 92 is rotatably arranged to wrap around the nip formation pad 91 and the stay 93.

The sheet P passes through the fixing nip N2 between the pressing belt 92 and the pressure roller 21 and is applied to heat and pressure, and the image is fixed on the sheet P. Other parts of the fixing device 9 illustrated in FIG. 9C are the same as the fixing device 9 illustrated in FIG. 2A.

The above describes the constructions of various fixing devices to which the embodiments of the present disclosure may be applied. However, the heating devices according to the embodiments of the present disclosure are also applicable to devices other than the fixing devices. For example, the heating devices according to the embodiments of the present disclosure are also applicable to a dryer installed in an image forming apparatus employing an inkjet method. The dryer dries ink applied onto the sheet. Alternatively, the heating devices according to the embodiments of the present disclosure may be applied to a coater (e.g., a laminator) that thermally presses a film as a coating member covering the surface of sheet in addition to the heating device that heats the sheet as a target to be heated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:
a heater;
a safety device having a heat-sensitive surface facing the heater, the safety device configured to cut off power supply to the heater in response to a temperature of the heat-sensitive surface being equal to or higher than a predetermined temperature; and
a holder configured to hold the heater, the holder forming a through hole that opens toward the heater, the holder including a step portion on an inner circumferential surface of the through hole, and the step portion configured to support an end of the heat-sensitive surface and separate a central portion of the heat-sensitive surface of the safety device from the heater, wherein
the step portion is in contact with a region of the heat-sensitive surface, and the region is within 2 mm from an outer peripheral edge of the heat-sensitive surface toward an inner portion of the heat-sensitive surface.

2. The heating device according to claim 1, further comprising
a biasing member configured to bias the safety device against the heater.

3. The heating device according to claim 1, further comprising
a thermal equalizer between the heater and the safety device.

4. The heating device according to claim 1, further comprising
a material having fluidity in a clearance between the heater and the heat-sensitive surface of the safety device.

5. The heating device according to claim 1,
wherein a clearance between an outer wall of the safety device and an inner circumferential surface of the through hole is less than 2 mm.

6. A fixing device comprising the heating device according to claim 1.

7. An image forming apparatus comprising the fixing device according to claim 6.

8. A heating device comprising:
a heater;
a safety device having a heat-sensitive surface facing the heater, the safety device configured to cut off power supply to the heater in response to a temperature of the heat-sensitive surface being equal to or higher than a predetermined temperature; and
a holder configured to hold the heater, the holder forming a through hole that opens toward the heater, the holder including a step portion on an inner circumferential surface of the through hole, and the step portion configured to support an end of the heat-sensitive surface and separate a central portion of the heat-sensitive surface of the safety device from the heater, wherein
the holder includes three step portions, the three step portions including the step portion, and the three step portions being at three positions in a circumferential direction of the through hole.

9. The heating device according to claim 8, further comprising:
a biasing member configured to bias the safety device against the heater.

10. The heating device according to claim 8, further comprising:
a thermal equalizer between the heater and the safety device.

11. The heating device according to claim 8, further comprising:
a material having fluidity in a clearance between the heater and the heat-sensitive surface of the safety device.

12. The heating device according to claim 8,
wherein a clearance between an outer wall of the safety device and an inner circumferential surface of the through hole is less than 2 mm.

13. A fixing device comprising the heating device according to claim 8.

14. An image forming apparatus comprising the fixing device according to claim 13.

15. A heating device comprising:
a heater;
a safety device having a heat-sensitive surface facing the heater, the safety device configured to cut off power supply to the heater in response to a temperature of the heat-sensitive surface being equal to or higher than a predetermined temperature; and
a holder configured to hold the heater, the holder forming a through hole that opens toward the heater, the holder including a step portion on an inner circumferential surface of the through hole, and the step portion configured to support an end of the heat-sensitive surface and separate a central portion of the heat-sensitive surface of the safety device from the heater, wherein
the heat-sensitive surface includes a first area not in contact with the step portion and a second area in contact with the step portion, and a ratio of the first area to the second area is 5 or more.

16. The heating device according to claim 15, further comprising:
a biasing member configured to bias the safety device against the heater.

17. The heating device according to claim 15, further comprising:
a thermal equalizer between the heater and the safety device.

18. The heating device according to claim 15, further comprising:
a material having fluidity in a clearance between the heater and the heat-sensitive surface of the safety device.

19. The heating device according to claim 15,
wherein a clearance between an outer wall of the safety device and an inner circumferential surface of the through hole is less than 2 mm.

20. A fixing device comprising the heating device according to claim 15.

* * * * *